US012075768B2

(12) United States Patent
Kijlstra et al.

(10) Patent No.: US 12,075,768 B2
(45) Date of Patent: Sep. 3, 2024

(54) WEED CONTROL APPARATUS

(71) Applicant: Discovery Purchaser Corporation, Wilmington, DE (US)

(72) Inventors: Johan Kijlstra, Odenthal (DE); Jerry Outram, Kent (GB); James Hadlow, Newmarket (GB)

(73) Assignee: Discovery Purchaser Corporation, Wilmington, DE (US)

( * ) Notice: Subject to any disclaimer, the term of this patent is extended or adjusted under 35 U.S.C. 154(b) by 1210 days.

(21) Appl. No.: 16/628,987

(22) PCT Filed: Jul. 2, 2018

(86) PCT No.: PCT/EP2018/067784

§ 371 (c)(1),
(2) Date: Jan. 6, 2020

(87) PCT Pub. No.: WO2019/007893

PCT Pub. Date: Jan. 10, 2019

(65) Prior Publication Data

US 2020/0141079 A1 May 7, 2020

(30) Foreign Application Priority Data

Jul. 6, 2017 (EP) .................................... 17180030
Jul. 17, 2017 (EP) .................................... 17181582
(Continued)

(51) Int. Cl.
*A01M 21/04* (2006.01)
*A01M 7/00* (2006.01)
(Continued)

(52) U.S. Cl.
CPC ............ *A01M 21/043* (2013.01); *A01M 7/00* (2013.01); *E01H 11/00* (2013.01); *G05B 15/02* (2013.01);
(Continued)

(58) Field of Classification Search
CPC ...... G06V 20/188; G06V 20/56; G06F 18/24; A01B 39/18; A01B 51/02; A01B 69/001;
(Continued)

(56) References Cited

U.S. PATENT DOCUMENTS 11,377,806 B2 7/2022 Day et al.
11,560,680 B2 1/2023 Baßfeld et al.
(Continued)

FOREIGN PATENT DOCUMENTS

CA 2818800 A1 5/2012
CN 1633536 A 6/2005
(Continued)

OTHER PUBLICATIONS

Chinese Office Action dated Dec. 30, 2021 for Chinese Application No. 2018800452556; 22 pages (English translation attached).
(Continued)

*Primary Examiner* — Margaret G Mastrodonato
(74) *Attorney, Agent, or Firm* — McBee Moore & Vanik IP LLC; Vinson Lin; Susan McBee

(57) ABSTRACT

A weed control apparatus for a vehicle includes a processing unit that receives at least one image of an environment. The processing unit analyses the at least one image to activate at least one chemical spray unit. A liquid weed control chemical is atomized and charged by the at least one chemical spray unit. The at least one chemical spray unit has at least one part configured to be held at high voltage with respect to zero volts potential. The at least one high voltage power supply and the at least one chemical spray unit are config-
(Continued)

ured to hold the at least one part of the at least one chemical spray unit at one or a number of high voltages with respect to zero volts potential, such that the atomized liquid weed control chemical is electrically charged.

16 Claims, 12 Drawing Sheets

(30) Foreign Application Priority Data

Aug. 16, 2017 (EP) .................................... 17186467
Aug. 22, 2017 (EP) .................................... 17187259

(51) Int. Cl.
*E01H 11/00* (2006.01)
*G05B 15/02* (2006.01)
*G06F 18/24* (2023.01)
*G06T 7/00* (2017.01)
*G06T 7/70* (2017.01)
*G06V 20/10* (2022.01)
*G06V 20/56* (2022.01)
*H04N 23/54* (2023.01)

(52) U.S. Cl.
CPC ............ *G06F 18/24* (2023.01); *G06T 7/0008* (2013.01); *G06T 7/70* (2017.01); *G06V 20/188* (2022.01); *G06V 20/56* (2022.01); *H04N 23/54* (2023.01); *G06T 2207/30188* (2013.01)

(58) Field of Classification Search
CPC .................... A01B 79/005; A01G 7/06; G06T 2207/30188; G06T 7/0008; G06T 7/70; A01M 7/00; A01M 7/0014; A01M 7/0042; A01M 7/0089
See application file for complete search history.

(56) References Cited

U.S. PATENT DOCUMENTS

| | | | | |
|---|---|---|---|---|
| 2008/0319673 | A1 | 12/2008 | Welty | |
| 2009/0226036 | A1 | 9/2009 | Gaal | |
| 2012/0101861 | A1 | 4/2012 | Lindores | |
| 2015/0002704 | A1 | 1/2015 | Vidal-Naquet | |
| 2015/0027040 | A1 | 1/2015 | Redden | |
| 2015/0027043 | A1 | 1/2015 | Lee | |
| 2015/0027044 | A1 | 1/2015 | Redden | |
| 2017/0024870 | A1 | 1/2017 | Reichhardt | |
| 2017/0066459 | A1 | 3/2017 | Singh | |
| 2017/0095834 | A1* | 4/2017 | Kinard | A01M 7/00 |

FOREIGN PATENT DOCUMENTS

| | | | |
|---|---|---|---|
| CN | 2759191 | Y | 2/2006 |
| CN | 101151418 | A | 3/2008 |
| CN | 101707992 | A | 5/2010 |
| CN | 101927220 | A | 12/2010 |
| CN | 101961003 | A | 2/2011 |
| CN | 102172233 | A | 9/2011 |
| CN | 103348964 | A | 10/2013 |
| CN | 103354716 | A | 10/2013 |
| CN | 103718684 | A | 4/2014 |
| CN | 104521929 | A | 4/2015 |
| CN | 105379460 | B | 7/2018 |
| EP | 1321037 | A | 6/2003 |
| EP | 2848121 | A | 3/2015 |
| GB | 1419429 | A | 12/1975 |
| JP | 2002159887 | A | 6/2002 |
| JP | 2008092917 | A | 4/2008 |
| JP | 2008194673 | A | 8/2008 |
| KR | 100538645 | B1 | 11/2005 |
| RU | 2129785 | C1 | 5/1999 |
| WO | 2004005625 | A1 | 1/2004 |
| WO | WO2013072887 | A2 | 5/2013 |
| WO | WO2013072887 | A3 | 5/2013 |
| WO | WO2015013723 | A2 | 1/2015 |
| WO | WO2015013723 | A3 | 1/2015 |
| WO | WO2016191825 | A1 | 12/2016 |
| WO | 2017002093 | A1 | 1/2017 |
| WO | WO2017077543 | A1 | 5/2017 |

OTHER PUBLICATIONS

Burgos-Artizzu, X. et al. (2011). "Real-time image processing for crop/weed discrimination in maize fields," Computers and Electronics in Agriculture, 75:337-346.
European Search Report dated Dec. 21, 2017 for EP Application No. 17186467, filed Aug. 16, 2017, 6 pages.
Gerhards, R. et al. (2016). "Practical experiences with a system for site-specific weed control in arable crops using real-time image analysis and GPS-controlled patch spraying," Weed Research 46(3): 185-193.
Herrera, P.J. et al. (2014). "A Novel Approach for Weed Type Classification Based on Shape Descriptors and a Fuzzy Decision-Making Method," Sensors, 14:15304-15324.
International Search Report mailed Aug. 24, 2018 for PCT Application No. PCT/EP2018/067784, filed Jul. 2, 2018, 5 pages.
Subasic, M. (Oct. 11, 2012) "Detection and classification of vegetation along the railroad tracks", Retrieved from the Internet: URL:https://www.fer.unizg.hr/download/repository/04d_M._Subasic-_Detection_and Classification ofVegetation_Along_the_Railroad_Tracks.pdf, XP055408597.
Weedfreeontrack (2010). "WeedFree on Track Spray Train", YouTube, Oct. 28, 2010, Retrieved from the Internet: URL:https://www.youtube.com/watch?v=sp3GPaQLOHg.
Weis, M. et al. (2016). "Detection of weeds using image processing and clustering," Bornimer Agrartechnische Berichte 69:138-144.
Written Opinion of the International Searching Authority mailed Aug. 24, 2018 for PCT Application No. PCT/EP2018/067784, filed Jul. 2, 2018, 10 pages.

* cited by examiner

Weed control chemical reservoir

High Voltage Power Supply

HV Cable

Liquid conduit

Spray guns/Atomizers. With different/same chemicals, voltages, heights.

Activated Spray gun/Atomizer, with ionization needle at high potential

Atomized liquid spraying a weed on the ground

Electrodes "60" at ground (zero volts) potential, trailing along the earth (ground)

Forward Motion

Activated Spray gun/Atomizer

Atomized liquid weed control chemical being sprayed on a weed on the ground

Forward Motion

Electrodes 60

Fig.

WEED CONTROL APPARATUS

CROSS REFERENCE TO RELATED APPLICATIONS

This application is a national stage application under 35 U.S.C. § 371 of International Application No. PCT/EP2018/067784, filed internationally on Jul. 2, 2018, which claims the benefit of priority to European Application Nos. 17180030.3, filed Jul. 6, 2017, 17181582.2, filed Jul. 17, 2017, 17186467.1, filed Aug. 16, 2017, and 17187259.1, filed Aug. 22, 2017.

FIELD OF THE INVENTION

The present invention relates to a weed control apparatus, to a weed control system, to a weed control method, as well as to a computer program element and a computer readable medium.

BACKGROUND OF THE INVENTION

The general background of this invention is weed control. Certain industrial areas and areas around railway tracks need to have the vegetation controlled. For railways, such control improves visibility from the perspective of people on the train such as the driver and improves visibility from the perspective of people working on the tracks. Such control can lead to improved safety. Additionally, vegetation can disrupt or damage tracks and associated signaling and communication lines. Control of the vegetation is then required to mitigate this. Vegetation control, also called weed control, can be very time and resource consuming, especially if carried out manually. A weed sprayer train, with a herbicide contained in chemical tanks on the train can be sprayed onto the track and surrounding area to control the vegetation. However, such weed control can be expensive, and the general public increasingly wishes to see a reduction in environmental impact. It would be advantageous to have an improved weed control apparatus.

SUMMARY OF THE INVENTION

It should be noted that the following described aspects and examples of the invention apply also for the weed control apparatus, the weed control system, the weed control method, and for the computer program element and the computer readable medium.

According to some embodiments, a weed control apparatus for a vehicle is provided, comprising:

an input unit;

a processing unit;

at least one chemical spray unit; and at least one high voltage power supply.

According to some embodiments, the input unit is configured to provide the processing unit with at least one image of an environment. The processing unit is configured to analyse the at least one image to activate the at least one chemical spray unit. The at least one chemical spray unit is configured to atomize a liquid weed control chemical. The at least one chemical spray unit has at least one part configured to be held at high voltage with respect to zero volts potential. The at least one high voltage power supply and the at least one chemical spray unit are configured to hold the at least one part of the at least one chemical spray unit at at least one high voltage with respect to zero volts potential, such that the atomized liquid weed control chemical is electrically charged.

In other words, a liquid chemical weed control system for a vehicle uses a spray unit, or a number of spray units, generate an atomized liquid spray that has a significant electrical charge relative to zero volts or ground potential. Thus, as the vehicle moves around an environment, imagery of that environment is analysed and used to activate the spray unit(s) to kill the weeds. The weeds growing on the ground will be at ground potential, substantially at zero volts, and an atomized liquid weed control "spray" will be attracted to the weeds. This means that firstly by activating the spray units, based on imagery, only areas where there are weeds needs to be sprayed, leading to less chemical being used. And, more of the liquid chemical that is sprayed ends up on the weeds because the spray is attracted to the weeds. Because the weeds are growing on the ground, and will be slightly closer to the nozzles of the spray unit than the ground itself, the electric field strength (volts per metre) between the spray unit and the weed is larger than between the spray unit and the ground (earth) itself, leading to the liquid spray being preferentially deposited on the weeds rather on the ground itself. Furthermore, liquid spray that passes the front side of, for example, a leaf of a weed can be attracted to and deposited on the back-side of the leaf due to the "wraparound" effect, leading to more of the weed being coated with chemical and an increase in the efficacy of spraying and/or enabling less chemical to be used or a less aggressive chemical to be used, with positive associated environmental effects resulting. Thus, electrically charged liquid weed control droplets or particles of the atomized liquid can change direction and be deposited on the top, sides and bottom of the weed even when only sprayed from the top.

As the spray unit is operating on a vehicle, where spraying will be for a moving platform, there is no particular problem with vegetation not requiring to be a very good conductor, because there is no excessive charge build up on the weed. This is because, according to some embodiments, as the spray unit is moving, each weed only receives a certain amount of spray before the spray unit has moved laterally and is available to spray an adjacent weed if image analysis indicates that there is a weed for which the spray unit needs to be activated. Thus, the weed does not become excessively charged. However, vegetation contains water and as such is conductive to a certain degree and the electrostatic spraying technique is effective in spraying weeds when carried out in the manner described.

To put this another way, creation of an electrostatic field pulls the atomized liquid spray particles onto the weeds being sprayed leading to increased coverage of weeds with the weed control chemical. The effects of wind are mitigated, such as drift of spray away from the area being sprayed, and the effect of a spray system being mounted on a moving vehicle are mitigated, which could lead to significant amounts of spray being blown away from the direction of the weeds. These negative effects are mitigated because the atomized liquid spray is attracted towards the weeds due to electrostatic forces. Additionally, liquid weed control chemical, in the form of droplets, are less likely to bounce off the weed which can happen if the weed has for example a waxing surface, because the drops are electrostatically attracted to the weed.

In this manner, the transfer efficiency of liquid weed control chemical to weeds is increased.

According to some embodiments, the at least one chemical spray unit is configured such that the atomized liquid weed control chemical is charged after it has been atomized.

In this way, a reservoir of liquid weed control chemical can be electrically isolated from the high voltage part of the spray unit(s), and can be held at ground potential leading to a simply and safe system. Furthermore, liquids can be used that need not be electrically conductive and indeed non-conductive liquid weed control chemicals can be atomized and then charged.

According to some embodiments, the at least one part comprises an electrode configured to be positioned within the atomized liquid weed control chemical.

In other words an ionization needle is used within a Corona charging system, where an electrode that can be pointed or sharply curved is raised to a high electrical potential, and the intense electric field at the electrode breaks down the surrounding air to create ions, when then attach themselves to the atomized liquid weed control chemical to charge it. Thus, the at least one chemical spray unit can comprise a number of spray guns with atomizing nozzles, and a charging electrode is located at or near the tip of each atomizing nozzle. An electric field is also created between the at least one part (charging electrode) and the weeds growing on the earth (ground) which are at zero volts and the atomized liquid weed control chemical, which is now electrostatically charged, is attracted to the weeds.

According to some embodiments, the processing unit is configured to analyse the at least one image to determine at least one location for activation of the at least one chemical spray unit.

According to some embodiments, analysis of the at least one image to determine at least one location for activation of the at least one chemical spray unit comprises a determination of at least one location of vegetation in the environment.

In other words, image processing can be used in order to determine the areas of vegetation in the acquired imagery, and the chemical spray units can be activated at those locations.

According to some embodiments, analysis of the at least one image to determine the at least one location for activation of the at least one chemical spray unit comprises a determination of at least one type of weed.

In other words, the at least one chemical spray unit can be activated in a manner to account for the type or types of weeds to be controlled. Thus for example, one type of weed may require only a short duration of liquid weed control spray to kill that weed, but a different type of weed may require a longer duration of liquid weed control spray to kill the weed. According to some embodiments, the chemical weed control units can be linked to more than one reservoir of weed control chemical, for example a very strong weed control chemical can be in one tank and used to kill difficult to control weeds, and a second tank can house a weaker chemical. Thus, the strong chemical can be used sparingly, only when it is needed in relation to a detection that difficult to control weeds have been found. The weaker chemical can then be used to control other weeds, thereby providing environmental and cost benefits. According to some embodiments, different chemicals being sprayed may require different electrostatic fields to optimize the electrostatically improved transfer to the weeds, because the liquids may have different surface tension and/or viscosities leading to the formation of different atomized drop sizes. Thus, when more than more chemical is being sprayed, which could be via one spray gun (or spray unit) spraying a first chemical and then spraying a second chemical or two spray guns spraying different chemicals at the same time, to spray two different weeds, each spray gun could be linked to a different power supply and be operating at a different voltage, with respect to ground potential, to the other spray gun (spray unit).

According to some embodiments, the at least one image was acquired by at least one camera, and the input unit is configured to provide the processing unit with at least one location associated with the at least one camera when the at least one image was acquired.

According to some embodiments, the location can be a geographical location, with respect to a precise location on the ground, or can be a location on the ground that is referenced to a position of the at least one chemical spray unit. In other words, an absolute geographical location can be utilized or a location on the ground that need not be known in absolute terms, but that is referenced to a location of the at least one chemical spray unit. According to some embodiments, by correlating an image with the location where it was acquired, the at least one chemical spray unit can be accurately activated at that location.

According to some embodiments, the apparatus comprises at least one electrode configured to be held at or close to zero volts potential. The apparatus is configured such that the at least one electrode can be positioned on a ground plane spaced away from the at least one chemical spray unit such that activation of the at least one chemical spray unit will result in liquid weed control chemical being sprayed at a location corresponding to the position on the ground plane of the at least one electrode.

In other words, the apparatus has spray unit(s) that have parts at high voltage and atomize and charge a liquid weed control chemical that is sprayed on and attracted to weeds growing on the ground that are at ground (zero volts) potential. The spray units are mounted on a vehicle that is moving as it sprays the weeds, and therefore there is no significant build up of charge on the weeds which may not be conductive. Such build up of charge can lead to the weeds becoming charged and leading to a reduction in the efficacy of the electrostatic effect attracting the charged liquid particles to the weeds. However, the apparatus now has grounded electrodes that can be positioned on the ground adjacent to the weeds being sprayed. For example, the apparatus when fitted to a vehicle can have a number of long thin metal strips or chains spaced laterally from one another, which are pulled along the ground to form a series of grounded lines that are positioned on the ground. This "ground plane" ensures that there is a definite zero volt ground plane, and mitigates the effect of charge build up both by improving discharge of charge from the weeds to this ground plane and also ensuring that the charged liquid particles continue to be generally attracted in the direction of the weeds. In this manner, the transfer of liquid chemical to the weeds is further improved, because any space charge effect caused by the weeds becoming charged, however slight, is mitigated.

According to some embodiments, there is provided a weed control system, comprising:

at least one camera;

a weed control apparatus according to the first aspect and any described example, wherein the weed control apparatus is mounted on a vehicle; and at least one reservoir configured to hold at least one liquid weed control chemical, wherein the at least one reservoir is mounted on the vehicle.

According to some embodiments, the at least one camera is configured to acquire the at least one image. The at least one chemical spray unit and the at least one reservoir are configured to be in fluid connection with each other. The weed control apparatus is configured to atomize, charge and spray the at least one liquid weed control chemical.

In this way, a vehicle can move around an environment and control weeds within that environment using chemical spray with increased transfer efficiency on the basis of imagery of that environment used to determine the exact location where to spray. In this way, imagery can be acquired by one platform, for example one or more drones that fly over an environment. That information is sent to an apparatus, that is mounted on a vehicle. The apparatus then activates the spray units at the correct locations within the environment.

According to some embodiments, the at least one camera is mounted on the vehicle.

In this manner, the system can operate in real time or quasi real time, by acquiring imagery, and analysing that imagery to determine when and where to activate the chemical spray units.

According to some embodiments, there is provided a weed control method for a vehicle, comprising:

a) providing a processing unit with at least one image of an environment;

c) analysing by the processing unit the at least one image to activate at least one chemical spray unit;

f) atomizing and charging a liquid weed control chemical by the at least one chemical spray unit; wherein the at least one chemical spray unit has at least one part configured to be held at high voltage with respect to zero volts potential; and wherein the at least one high voltage power supply and the at least one chemical spray unit are configured to hold the at least one part of the at least one chemical spray unit at at least one high voltage with respect to zero volts potential, such that the atomized liquid weed control chemical is electrically charged.

According to some embodiments, step f) comprises atomizing the liquid weed control chemical prior to charging.

According to some embodiments, in step a) the at least one image was acquired by at least one camera; and wherein the method comprises step b) providing the processing unit with at least one location associated with the at least one camera when the at least one image was acquired.

According to some embodiments, the method comprises step d) holding at least one electrode at or close to zero volts potential, and comprises step e) positioning the at least one electrode on a ground plane spaced away from the at least one chemical spray unit, and comprises step g) spraying by the at least one chemical spray unit the liquid weed control chemical at a location corresponding to the position on the ground plane of the at least one electrode.

According to some embodiments, there a computer program element is provided for controlling an apparatus according to the apparatus of the first aspect and/or system according to the second aspect, which when executed by a processor is configured to carry out the method of the third aspect.

Advantageously, the benefits provided by any of the above aspects equally apply to all of the other aspects and vice versa.

BRIEF DESCRIPTION OF THE DRAWINGS

Exemplary embodiments will be described in the following with reference to the following drawings.

DETAILED DESCRIPTION OF EMBODIMENTS

Figure 1:
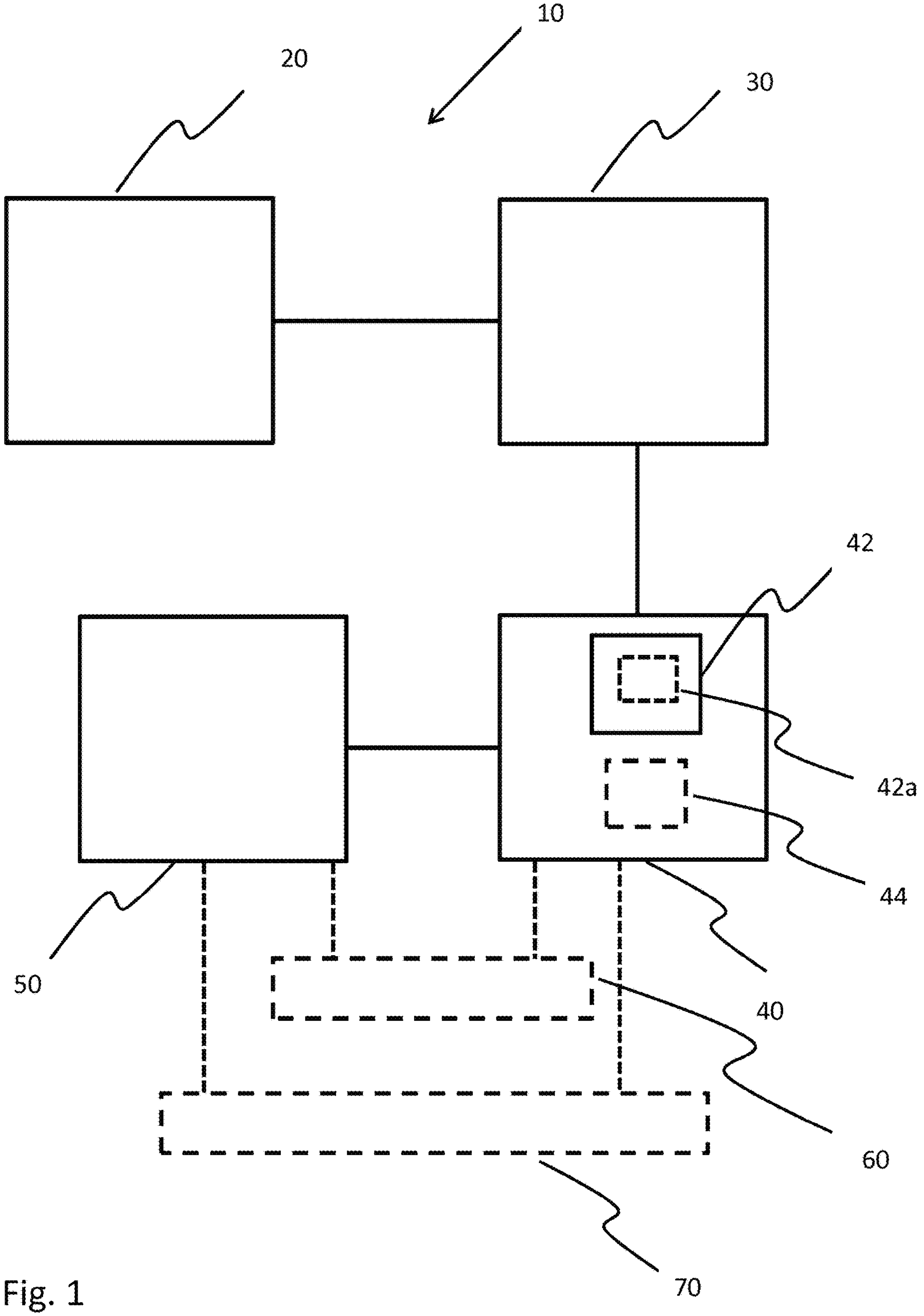
FIG. 1 shows an exemplary schematic of a weed control apparatus according to some embodiments.

FIG. 1 shows an example of a weed control apparatus 10 for a vehicle according to some embodiments. The apparatus 10 comprises an input unit 20, a processing unit 30, at least one chemical spray unit 40 and at least one high voltage power supply 50. The input unit 20 is configured to provide the processing unit 30 with at least one image of an environment. The processing unit 30 is configured to analyse the at least one image to activate the at least one chemical spray unit 40. The at least one chemical spray unit 40 is configured to atomize a liquid weed control chemical. The at least one chemical spray unit 40 has at least one part 42 configured to be held at high voltage with respect to zero volts potential. The at least one high voltage power supply 50 and the at least one chemical spray unit 40 are configured to hold the at least one part 42 of the at least one chemical spray unit 40 at at least one high voltage with respect to zero volts potential, such that the atomized liquid weed control chemical is electrically charged. Thus, the at least one high voltage power supply 50 and the at least one chemical spray unit 40 are able to hold one or a number of chemical spray units at one or a number of different high voltages. Thus, the voltage of one chemical spray unit can be changed, and different chemical spray units can have different voltages at the same time and one or more of those individual voltages for specific chemical spray units can be varied over time. Such variation includes operation from an off state to an on state, and operation from an on state to an off state. Thus, a spray unit can go from zero volts to −100 kV for example when it is atomizing and charging and spraying a liquid weed control chemical and then back to zero volts after a weed has been sprayed. However, the spray guns can be held continuously at a high voltage, albeit one that can change in time as discussed above.

“High” with respect to “High Voltage” is used in the normal sense and means a magnitude that can be positive or negative with respect to ground potential (zero volts).

According to some embodiments, each unit of the at least one chemical spray unit has at least one part configured to be held at high voltage with respect to zero volts potential According to some embodiments, each unit of the chemical spray unit comprises a chemical spray gun or nozzle and a conduit configured to lead to a chemical reservoir. According to some embodiments, the at least one chemical spray unit comprises at least one liquid weed control chemical reservoir.

Thus, "at least one chemical spray unit" can mean at least one spray gun (or nozzle). Also, "at least one chemical spray unit" can mean at least one spray gun (or nozzle) with associated liquid transfer conduits. Also, "at least one chemical spray unit" can mean at least one spray gun (or nozzle) with associated liquid transfer conduits and at least one chemical reservoir.

According to some embodiments, the high voltage has a magnitude of 20 kV. In an example the high voltage has a magnitude 40 kV. According to some embodiments, the high voltage has a magnitude 60 kV. According to some embodiments, the high voltage has a magnitude 80 kV. According to some embodiments, the high voltage has a magnitude 100 kV. According to some embodiments, the high voltage has a magnitude 120 kV. According to some embodiments, the high voltage has a magnitude 140 kV. According to some embodiments, the high voltage has a magnitude 160 kV. According to some embodiments, the high voltage has a magnitude 180 kV. According to some embodiments, the high voltage has a magnitude 200 kV. According to some embodiments, the high voltages can be greater in magnitude than 200 kV. According to some embodiments, the high voltages can be positive or negative leading to positive or negative charged atomized liquid spray droplets, however normally operation is at a high negative voltage.

According to some embodiments, the high voltage at which the at least one part of the at least one chemical spray unit is held is negative with respect to zero volts potential.

According to some embodiments, the apparatus is configured such that the atomized liquid weed control chemical is negatively charged.

According to some embodiments, the apparatus comprises an output unit that is in communication with the processing unit, and wherein the output unit is configured to activate the at least one chemical spray unit. Thus the output unit has the necessary relays and electrical control to activate the spray units under the control of the processing unit.

According to some embodiments, the apparatus is operating in real-time, where images are acquired and immediately processed and the chemical spray unit(s) is immediately used to activate those spray units to control weeds. Thus, for example a vehicle can acquire imagery of its environment and process that imagery to activate the spray units in real-time.

According to some embodiments, the apparatus is operating in an offline mode, where images are acquired (by the apparatus or by another appropriate system) of an environment and later processed by the apparatus to activate the chemical spray unit. Thus for example, a first vehicle, such as a car, train, lorry or unmanned aerial vehicle (UAV) or drone equipped with one or more cameras can travel within an environment and acquire imagery. This imagery can then be processed, later, by the apparatus that is moving around the around, to activate the chemical spray units.

According to some embodiments, the at least one chemical spray unit comprises an atomizer 44 configured to atomize the liquid weed control chemical. According to some embodiments, the atomizer is configured to use compressed air to atomize the liquid weed control chemical. In an example, the atomizer comprises a spinning metal disc. Thus, the rotational bell system can be used to atomize the liquid weed control chemical, and the spinning disc can also be the part that is held at a high voltage, such that the metal disc also imparts the electrical charge to the atomized liquid.

It is to be noted that "atomized" does not mean individual atoms, but relates to the standard use of this term with respect to spray systems, meaning a fine mist of particles that can range in sizes.

According to some embodiments, the at least one chemical spray unit is configured such that the liquid weed control chemical is charged prior to it being atomized. According to some embodiments, the at least one part that is held at a high potential is in contact with the liquid within a spray gun, in which case each spray unit has a spray gun and each spray gun has a part in contact with the liquid weed control chemical that is held at high potential. According to some embodiments, the at least one part that is held at a high potential is in contact with the liquid within a conduit that leads to a spray gun, in which case each spray unit has a spray gun and each spray gun has a conduit inside of which is a part in contact with the liquid weed control chemical that is held at high potential. According to some embodiments, the at least one part that is held at a high potential is in contact with the liquid within a spray gun, in which case each spray unit has a spray gun and each spray gun connects to a reservoir that holds a liquid weed control chemical with these forming the at least one chemical spray unit, and therefore there needs to be only one part that is inside the reservoir that is in contact with the liquid weed control chemical that is held at high potential.

In other words, a Contact charging system is used, where the liquid weed control chemical is directly charged prior to it being atomized.

According to some embodiments, the at least one chemical spray unit is configured such that the liquid weed control chemical is charged as it is being atomized.

In other words, frictional charging (or Tribo charging) is used to charge the liquid weed control chemical. In this way, a simple spray system can be constructed, where the liquid is atomized and charged due to the geometry of the nozzle itself, as is known for spray systems utilizing frictional charging, and an electric field between the spray unit, at high voltage, and the weeds being sprayed, at ground potential. Thus, a part of the at least one spray unit that is at high voltage does not need to be in contact with the liquid weed control chemical, which can be at ground potential providing improved safety.

According to some embodiments, the processing unit is configured to analyse the at least one image to determine at least one mode of operation of the at least one chemical spray unit to be used for weed control for at least a first part of the environment.

In other words, an image or images of an environment have been acquired. Chemical spray unit(s) can operate in a number of different modes of operation, such as spraying different chemicals, operating at different high voltages to vary the electric field between a spray unit and a weed to be sprayed, varying a distance between the spray unit and a weed to be sprayed. The apparatus then analyses the image or images to determine which one or ones of the available modes of operation of the at least one chemical spray unit should be used to control weeds at a specific location or locations of the environment.

In this way, the most appropriate mode of operation of spray units can be used for different areas of the environment. According to some embodiments, at different areas of the environment, different modes of operation of the spray units can be used, where each mode of operation is the most appropriate for each different area.

According to some embodiments, the at least one chemical spray unit is configured such that the atomized liquid weed control chemical is charged after it has been atomized.

According to some embodiments, the at least one part 42 comprises an electrode 42*a* configured to be positioned within the atomized liquid weed control chemical.

According to some embodiments, the processing unit is configured to analyse the at least one image to determine at least one location for activation of the at least one chemical spray unit.

According to some embodiments, analysis of the at least one image to determine at least one location for activation of the at least one chemical spray unit comprises a determination of at least one location of vegetation in the environment.

According to some embodiments, the processing unit is configured to determine the at least one mode of operation of the at least one chemical spray unit to be used at that at least one location of vegetation in the environment.

According to some embodiments, analysis of the at least one image to determine the at least one location for activation of the at least one chemical spray unit comprises a determination of at least one type of weed.

According to some embodiments, analysis of the at least one image comprises utilisation of a machine learning algorithm. According to some embodiments, the machine learning algorithm comprises a decision tree algorithm. According to some embodiments, the machine learning algorithm comprises an artificial neural network.

According to some embodiments, the machine learning algorithm has been taught on the basis of a plurality of images. According to some embodiments, the machine learning algorithm has been taught on the basis of a plurality of images containing imagery of at least one type of weed. According to some embodiments, the machine learning algorithm has been taught on the basis of a plurality of images containing imagery of a plurality of weeds.

According to some embodiments, the processing unit is configured to determine the at least one mode of operation of the at least one chemical spray unit to be used based on the type of weed determined to be at that at least one location in the environment.

In other words, the appropriate mode of operation of chemical spray units can be selected to account for the type or types of weeds to be controlled. Thus for example, one type of weed may require only a short duration spray of a particular type of chemical in order to kill that weed, but a different type of weed may require a longer duration of spray of the same chemical to kill the weed. Or, a different chemical can be sprayed on different weeds, or different high voltages utilized, where for example some weeds may only need one surface of a leaf to be sprayed in order to kill it, whilst control of another weed may be dramatically improved when both sides of a leaf are sprayed and based on image processing that determines that this type of weed is present the apparatus can vary the voltages during spraying of that weed to increase the wraparound effect, such that electrostatic forces attract the atomized liquid to the underside of the leaf as well.

According to some embodiments, the at least one image was acquired by at least one camera. The input unit is configured to provide the processing unit with at least one location associated with the at least one camera when the at least one image was acquired.

According to some embodiments, the location is an absolute geographical location.

According to some embodiments, the location is a location that is determined with reference to the position of the at least one chemical spray unit. In other words, an image can be determined to be associated with a specific location on the ground, without knowing its precise geographical position, but by knowing the position of the at least one chemical spray unit with respect to that location at the time the image was acquired, the at least one chemical spray unit can then be activated at a later time at that location by moving the at least one chemical spray unit to that location.

According to some embodiments, a GPS unit is used to determine, and/or is used in determining, the location of the at least one camera when specific images were acquired.

According to some embodiments, an inertial navigation unit is used alone, or in combination with a GPS unit, to determine the location of the at least one camera when specific images were acquired. Thus for example, the inertial navigation unit, comprising for example one or more laser gyroscopes, is calibrated or zeroed at a known location and as it moves with the at least one camera the movement away from that known location in x, y, and z coordinates can be determined, from which the location of the at least one camera when images were acquired can be determined.

According to some embodiments, image processing of acquired imagery is used alone, or in combination with a GPS unit, or in combination with a GPS unit and inertial navigation unit, to determine the location of the at least one camera when specific images were acquired.

According to some embodiments, the processing unit is configured to analyse the at least one image to activate the at least one high voltage power supply to hold the at least one part of the at least one chemical spray unit at a high voltage with respect to zero volts potential.

According to some embodiments, at least one activation time for the at least one high voltage power supply comprises at least one activation time for the at least one chemical spray unit. In other words, the apparatus powers up the spray unit in terms of raising the appropriate part to a high potential and holding it at that high potential, and then the spray unit activates to atomize and charge the atomized liquid and then the spraying of the liquid stops, but the high voltage is still being applied and the atomized liquid is attracted to the weeds because of the electrostatic field. In this way, the system only powers up to high voltage when required, with power savings as well as improved safety being provided.

According to some embodiments, the apparatus comprises at least one electrode 60 configured to be held at or close to zero volts potential. The apparatus is configured such that the at least one electrode can be positioned on a ground plane spaced away from the at least one chemical spray unit such that activation of the at least one chemical spray unit will result in liquid weed control chemical being sprayed at a location corresponding to the position on the ground plane of the at least one electrode.

According to some embodiments, rather than use grounded electrodes the apparatus comprises at least one conductive liquid spray unit 70. The processing unit is configured to analyse the at least one image to activate the at least one conductive liquid spray unit. A time of activation of the at least one conductive liquid spray unit is prior to a time of activation of the at least one chemical spray unit.

In this manner, to mitigate any build up of charge on the weeds leading to a potential reduction in the increased transfer efficiency of weed control chemical to the weeds, a conductive spray can be sprayed onto the weeds prior to spraying of the liquid weed control chemical. In this way, any potential charge build on the weeds is mitigated, and the transfer of liquid chemical to the weeds is further improved, because any space charge effect caused by the weeds becoming charged, however slight, is mitigated.

According to some embodiments, the conductive liquid is brine.

According to some embodiments, the processing unit is configured to analyse the at least one image to determine at least one location for activation of the at least one conductive liquid spray unit.

According to some embodiments, analysis of the at least one image to determine at least one location for activation of the at least one conductive liquid spray unit comprises a determination of at least one location of vegetation in the environment.

In other words, image processing can be used in order to determine the areas of vegetation in the acquired imagery, and a conductive spray can be sprayed at those locations.

According to some embodiments, the location for activation of the at least one conductive liquid spray unit is the same as the location for activation of the at least one chemical spray unit.

According to some embodiments, the same spray unit is used to spray both the conductive liquid and the liquid weed control chemical, through the unit being connected to two reservoirs. The unit is then connected to the conductive chemical reservoir and the chemical can be sprayed, again being charged and atomized in order that the liquid is effectively transferred to the weeds. Then the unit is connected to the liquid weed control chemical reservoir, and the unit activates again. Such transfer between reservoirs can be carried out extremely quickly enabling the same unit to spray a weed twice even when on a moving platform. According to some embodiments, different spray units are used, because the conductive chemical need not be charged during spraying, but can be if necessary.

Figure 2:
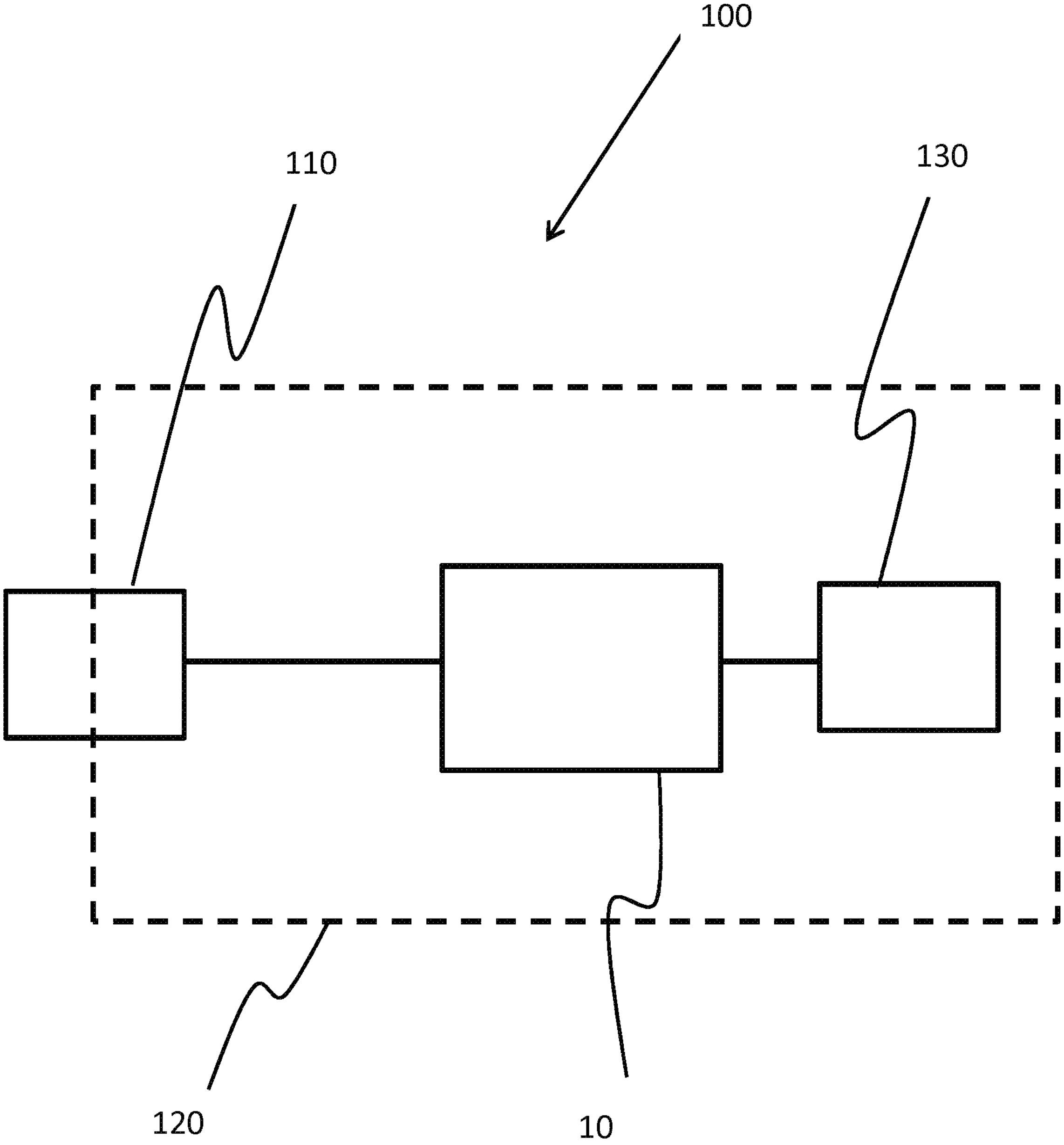
FIG. 2 shows an exemplary schematic of a weed control system according to some embodiments.

FIG. 2 shows an example of a weed control system 100 according to some embodiments. The system 100 comprises at least one camera 110, a weed control apparatus 10 as described with respect to FIG. 1 and any of the associated examples. The weed control apparatus 10 is mounted on a vehicle 120. The system also comprises at least one reservoir 130 configured to hold at least one liquid weed control chemical. The at least one reservoir is mounted on the vehicle 120. The at least one camera 110 is configured to acquire the at least one image. The at least one chemical spray unit 40 and the at least one reservoir 130 are configured to be in fluid connection with each other. This enables liquid weed control chemical(s) to flow from the reservoir or reservoirs to spray guns or nozzles. The weed control apparatus is configured to atomize, charge and spray the at least one liquid weed control chemical.

According to some embodiments, the system comprises at least one distance sensor configured to determine a distance between the at least chemical spray unit and the ground, and wherein the at least one distance sensor is configured to provide the processing unit with the distance, and wherein the processing unit is configured to instruct the system to move the at least one reservoir to be a predefined distance from the ground. In an example, the predefined distance is 10 cm. According to some embodiments, the predefined distance is 20 cm. According to some embodiments, the predefined distance is 30 cm. According to some embodiments, the predefined distance is 40 cm. According to some embodiments, the predefined distance is 50 cm. According to some embodiments, the predefined distance is 60 cm. In an example, the predefined distance is 70 cm. According to some embodiments, the predefined distance is 80 cm. According to some embodiments, the predefined distance is 90 cm. According to some embodiments, the predefined distance is 100 cm. According to some embodiments, the predefined distance is 120 cm. According to some embodiments, the predefined distance is 140 cm. In this way, the required spacing of a spray unit to the ground, for example of a spray gun to the ground, can be maintained to ensure that not only are the spray characteristics optimized but also that the electric field strength (volts per metre) is optimized in order to optimize the transfer of the weed control chemical to the weeds. According to some embodiments, a distance sensor is a laser based time of flight or LED based time of flight sensor. According to some embodiments, a distance sensor is a radar sensor. According to some embodiments, a distance sensor is an ultrasonic sensor.

According to some embodiments, the at least one camera is mounted on the vehicle. According to some embodiments, the vehicle is a train. According to some embodiments, the vehicle is a lorry or truck or Unimog.

According to some embodiments, the input unit is configured to provide the processing unit with at least one location associated with the at least one camera when the at least one image was acquired. According to some embodiments, the location is a geographical location.

According to some embodiments, the apparatus is configured to activate the at least one chemical spray unit on the basis of the at least one geographical location associated with the at least one camera when the at least one image was acquired and a spatial relationship between the at least one camera and the at least one chemical spray unit. In this manner, by knowing where the image has been acquired by a camera mounted on a vehicle and also knowing where a chemical spray unit is mounted on the vehicle with respect to the camera, it is simple to take into account the forward speed of the vehicle in order to activate that chemical spray unit at the same location where the image was acquired, and indeed within that imaged area.

Figure 3:
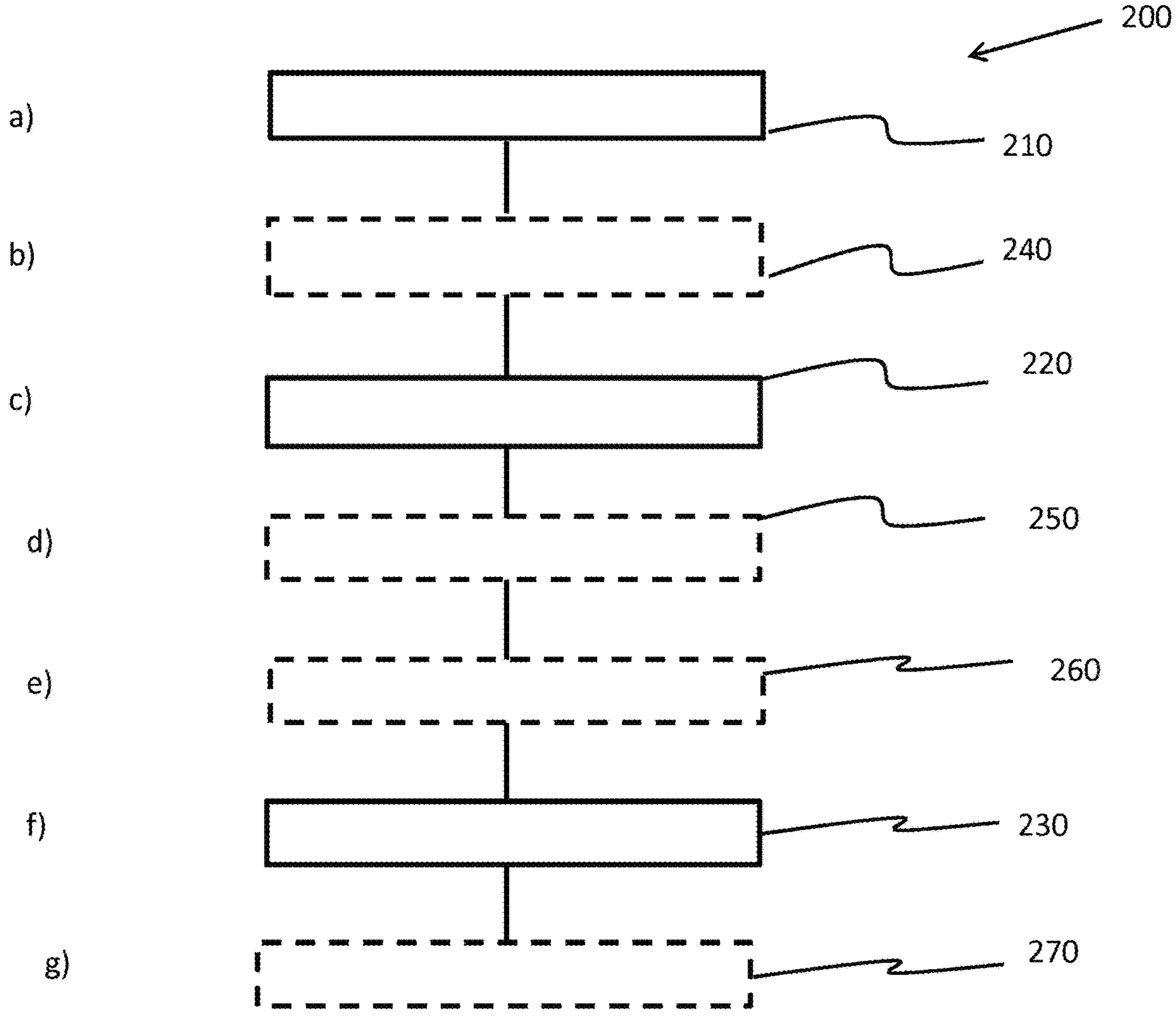
FIG. 3 shows a flow diagram describing a weed control method according to some embodiments.

FIG. 3 shows a flow diagram describing a weed control method 200 for a vehicle according to some embodiments. According to some embodiments, method 200 includes: a providing step 210, also referred to as step a), providing a processing unit with at least one image of an environment; an analyzing step 220, also referred to as step c), analysing by the processing unit the at least one image to activate at least one chemical spray unit; an atomizing and charging step 230, also referred to as step f), atomizing and charging a liquid weed control chemical by the at least one chemical spray unit. The at least one chemical spray unit has at least one part configured to be held at high voltage with respect to zero volts potential. The at least one high voltage power supply and the at least one chemical spray unit are configured to hold the at least one part of the at least one chemical spray unit at at least one high voltage with respect to zero volts potential, such that the atomized liquid weed control chemical is electrically charged.

According to some embodiments, step f) comprises atomizing the liquid weed control chemical prior to charging.

According to some embodiments, the at least one part comprises an electrode configured to be positioned within the atomized liquid weed control chemical.

According to some embodiments, step c) comprises analysing by the processing unit the at least one image to determine at least one location for activation of the at least one chemical spray unit. According to some embodiments, step c) comprises a determination of at least one location of vegetation in the environment. According to some embodiments, step c) comprises a determination of at least one type of weed.

According to some embodiments, in step a) the at least one image was acquired by at least one camera. The method can then comprise step b) providing 240 the processing unit with at least one location associated with the at least one camera when the at least one image was acquired.

According to some embodiments, the method comprises step d) holding 250 at least one electrode at or close to zero volts potential, and comprises step e) positioning 260 the at least one electrode on a ground plane spaced away from the at least one chemical spray unit, and comprises step g) spraying 270 by the at least one chemical spray unit the liquid weed control chemical at a location corresponding to the position on the ground plane of the at least one electrode.

According to some embodiments, apparatus for weed control comprises at least one conductive liquid spray unit 80. The processing unit is configured to analyse the at least one image to activate the at least one conductive liquid spray unit. A time of activation of the at least one conductive liquid spray unit is prior to a time of activation of the at least one chemical spray unit.

The apparatus, system and method for weed control are now described in more detail in conjunction with FIGS. 4-12, which relate to weed control in the environment of a railway track according to some embodiments. An apparatus as described above, according to some embodiments, can be mounted onto a train with the capabilities to atomize and spray one or a number of liquid weed control chemicals.

Figure 4:
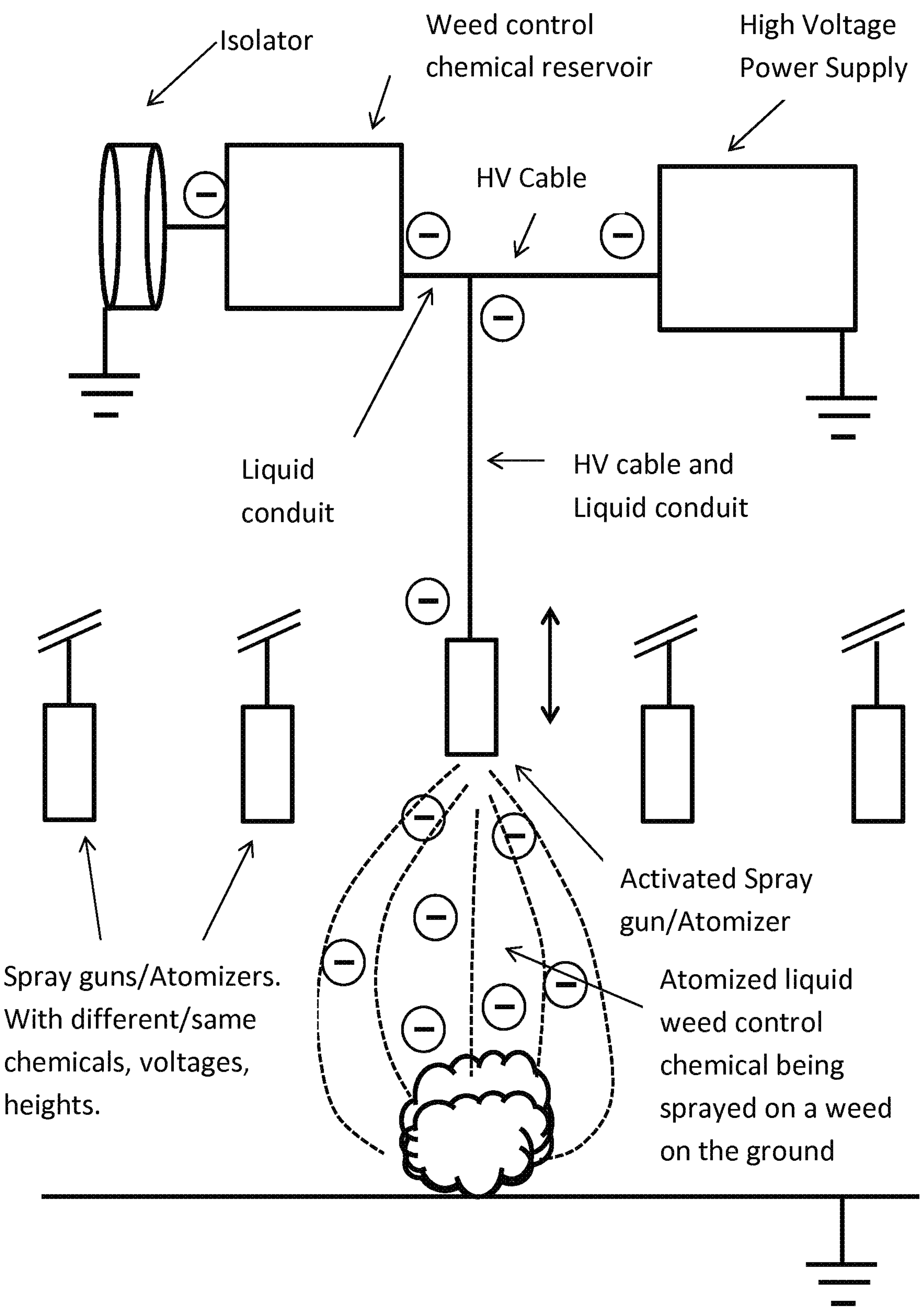
FIG. 4 shows an exemplary schematic of parts of a weed control system according to some embodiments.

FIG. 4 shows parts of an example of a weed control system according to some embodiments. Mounted on a train are a number of chemical spray unit with spray guns, which can also be termed atomizers or nozzles. One atomizer is shown in operation. The atomizer is electrically connected via a high voltage cable to a high voltage power supply. This can operate in the range (+/−) 20-200 kV. In the example shown the atomizer is operating at minus (−)100 kV. The atomizer is also connected to a reservoir containing a liquid weed control chemical, via a liquid conduit. A part of the connection running from the atomizer can be a combined high voltage/liquid conduit “cable”, as shown in FIG. 4. However, completely separate cables/conduits can be used. The liquid is required in this instance to be held at or close to −100 kV when it is being atomized. This is achieved through connection of the high voltage supply to the atomizer housing, which is in contact with the liquid to be atomized. However, because the liquid is conductive, the high voltage supply could be connected to the reservoir directly, and the atomizer would still be held at or close to −100 kV. Indeed, the reservoir is also held at high potential, requiring an electrical isolator to be used, as shown in FIG. 4. The atomizer atomizes the liquid weed control chemical using pressurized air, coming from a compressor in a manner similar to that used for paint spray guns. The liquid droplets are negatively charged and are attracted to the weed at ground potential (zero volts). However, different ways of atomizing the liquid are possible and as such the means to atomize the liquid are not shown in FIG. 4. Also, the atomizer can operate at a positive high voltage and the liquid droplets be positively charged, which are then attracted to the weed at ground potential.

According to some embodiments, on the basis of acquired imagery, discussed in more detail below, the location and type of weed is determined. A processing unit, not shown, determines the specific liquid weed control chemical to be used, and the optimum spraying conditions for spraying of the weed. A specific atomizer is determined as being required to spray the weed. The height of the atomizer is then adjusted to an optimum height with respect to the required spraying conditions of voltage and field strength, which also takes into account the height of the weed above the ground. The voltage is applied to the atomizer, the atomizer atomizes the liquid and the fine spray is electrically charged and attracted to the weed to cover it as required, including the sides and undersides of the weed leaves. According to some embodiments, rather than operate at different voltages, the atomizer can operate at a single voltage which need not be switched on and off but could always be one, and rather than operate at different heights the atomizer can operate at a set height above the ground.

Also shown in FIG. 4 are a number of other atomizers according to some embodiments. These can all be connected to the same high voltage supply. However, different ones can be connected to different power supplies, facilitating the operation of different atomizers at the same time and at different voltages. The atomizers can all be connected to the same liquid weed control chemical reservoir; however a number can be connected to different reservoirs enabling different chemicals to be sprayed. Again, these other atomizers can have their height above the ground varied, as well as the voltage applied to them varied in the same manner as described above for the central atomizer of FIG. 4. However, again the atomizers can operate at the same voltage, and at the same height if necessary.

Figure 5:
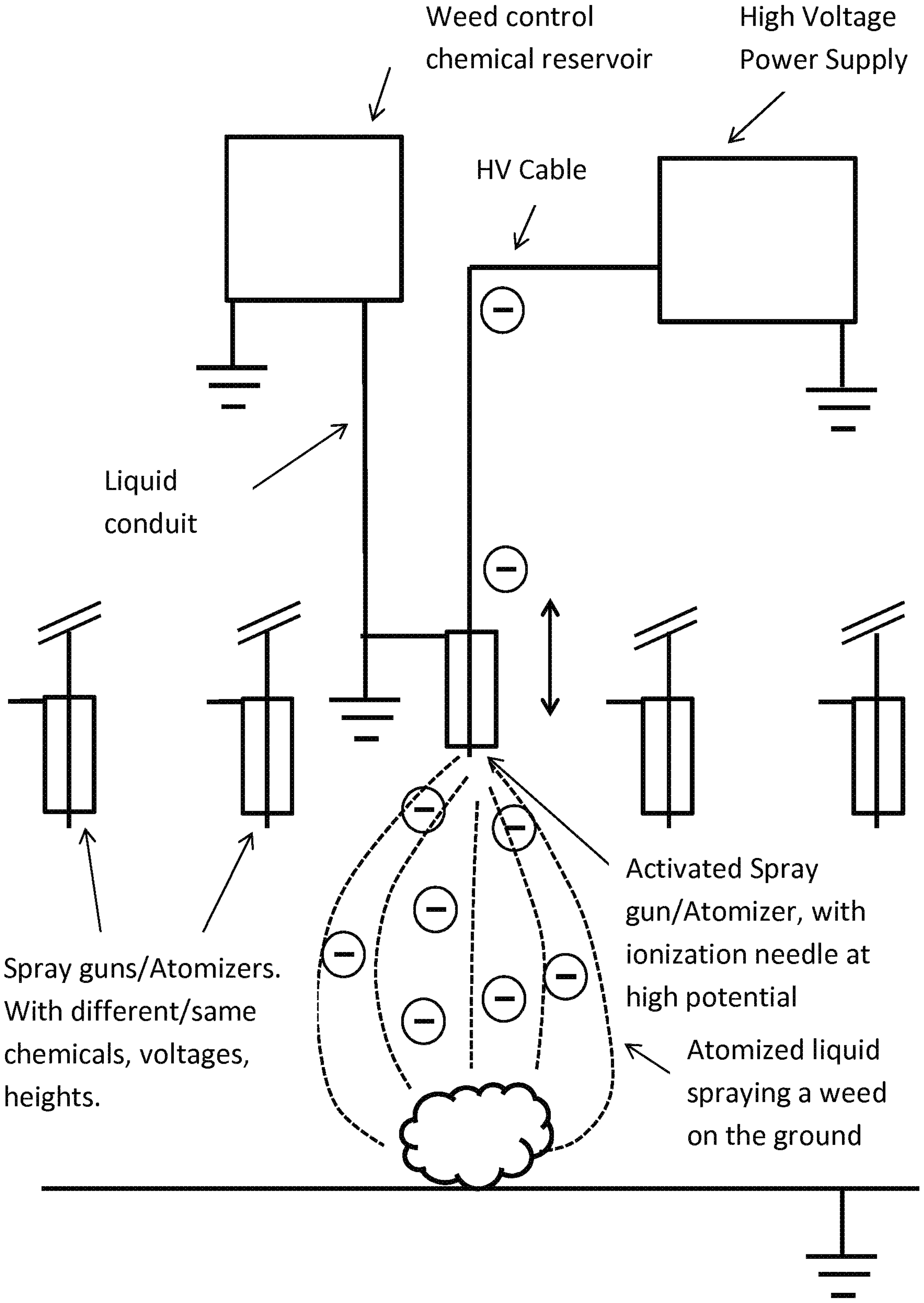
FIG. 5 shows an exemplary schematic of parts of a weed control system according to some embodiments.

According to some embodiments, FIG. 5 shows parts of an example of a weed control system, that is similar to that described with respect to FIG. 4 but has the added advantage that less of the parts of the system need to be held at high voltage. Now, the high voltage is applied to an ionization needle. Again, the atomizer atomizes the liquid weed control chemical. However, the liquid is not held a high potential because the body of the atomizer is isolated from the ionization needle. However, the ionization needle is situated in the atomized liquid stream. The air is ionized, and ions are attracted to the liquid droplets which become charged. In this way the reservoir as well as the atomizer body need not be at high potential. In this system the efficiency of electrostatic charging the liquid chemical can be less than the direct charging mechanism shown in FIG. 4, but there are safety advantages provided. The other features, such as operational voltages and heights, are as described for FIG. 4.

Figure 6:
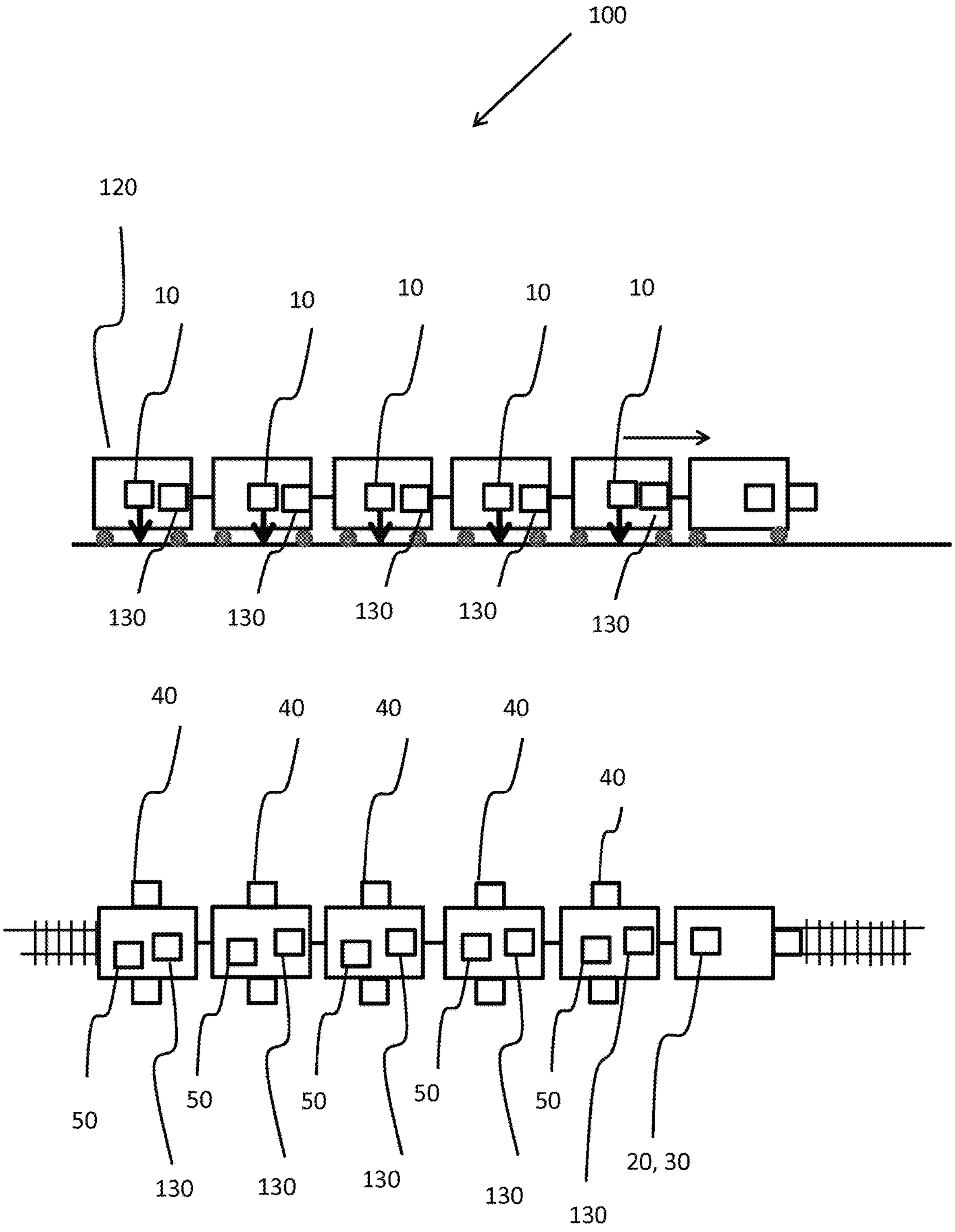
FIG. 6 shows an exemplary schematic of a weed control system according to some embodiments.

FIG. 6 shows an example of a weed control system 100 according to some embodiments. Several drones have cameras 110. The drones fly along a railway track. The cameras acquire imagery of the environment of the railway track, with this being the ground between the track and the ground to the sides of the track. The environment being imaged is that that is required to have weeds controlled. There need not be several drones, and one drone with one camera 110 can acquire the necessary imagery. Indeed, the imagery could have been acquired by a camera 110 or cameras 110 that were hand held by personnel visiting the railway track environment, by a plane, satellite or by a train that has run along the railway track for example. The imagery acquired by the cameras 110 is at a resolution that enables vegetation to be identified as vegetation and indeed can be at a resolution that enables one type of weed to be differentiated from another type of weed. The acquired imagery can be colour imagery but need not be. The imagery acquired by the drones is transmitted to an apparatus 10. The imagery can be transmitted to the apparatus 10 as soon as it has been acquired by the cameras 110, or can be transmitted at a later time than when it was acquired, for example when the drones have landed. The drones can have Global Positioning Systems (GPS) and this enables the location of acquired imagery to be determined. For example the orientation of cameras 110 and the position of the drone when imagery was acquired can be used to determine the geographical footprint of the image at the ground plane. The drones can also have inertial navigation systems, based for example on laser gyroscopes. In addition to being used to determine the orientation of the drone and hence of the camera, facilitating a determination of where on the ground the imagery has been acquired, the inertial navigation systems can function alone without a GPS system to determine the position of the drone, by determining movement away from a known or a number of known locations.

According to some embodiments, an input unit 20 of the apparatus 10 passes the acquired imagery to a processing unit 30. Image analysis software operates on the processing unit 30. The image analysis software can use feature extraction, such as edge detection, and object detection analysis that for example can identify structures such as railway tracks, sleepers, trees, level crossings, station platforms. Thus, on the basis of known locations of objects, such as the locations of buildings within the environment, and on the basis of known structure information such as the distance between sleepers and the distance between the railway tracks, the processing unit can patch the acquired imagery to in effect create a synthetic representation of the environment that can in effect be overlaid over a geographical map of the environment. Thus, the geographical location of each image can be determined, and there need not be associated GPS and/or inertial navigation based information associated with acquired imagery. However, if there is GPS and/or inertial navigation information available then such image analysis, that can place specific images at specific geographical locations only on the basis of the imagery, is not required. Although, if GPS and/or inertial navigation based information is available then such image analysis can be used to augment the geographical location associated with an image. Thus for example, if on the basis of GPS and/or inertial navigation based information the centre of an acquired image is deemed to be located 22 cm from the side edge and 67 cm from the end of a particular railway sleeper of a section of railway, whilst from the actual acquired imagery, through the use of the above described image analysis, the centre of the image is determined to be located 25 cm from the edge and 64 cm from the end of the sleeper, then the GPS/inertial navigation based derived location can be augmented by shifting the location 3 cm in one direction and 3 cm in another direction as required.

According to some embodiments, the processing unit 30 runs further image processing software. This software analyses an image to determine the areas within the image where vegetation is to be found. Vegetation can be detected based on the shape of features within acquired images, where for example edge detection software is used to delineate the outer perimeter of objects and the outer perimeter of features within the outer perimeter of the object itself. A database of vegetation imagery can be used in helping determine if a feature in imagery relates to vegetation or not, using for example a trained machine learning algorithm such as an artificial neural network or decision tree analysis. The camera can acquire multi-spectral imagery, with imagery having information relating to the colour within images, and this can be used alone, or in combination with feature detection to determine where in an image vegetation is to be found. As discussed above, because the geographical location of an image can be determined, from knowledge of the size of an image on the ground, the location or locations of vegetation to be found in an image can then be mapped to the exact position of that vegetation on the ground.

According to some embodiments, the processing unit 30 then runs further image processing software that can be part of the image processing that determines vegetation location on the basis of feature extraction, if that is used. This software comprises a machine learning analyser. Images of specific weeds are acquired, with information also relating to the size of weeds being used. Information relating to a geographical location in the world, where such a weed is to be found and information relating to a time of year when that weed is to be found, including when in flower etc. can be tagged with the imagery. The names of the weeds can also be tagged with the imagery of the weeds. The machine learning analyser, which can be based on an artificial neural network or a decision tree analyser, is then trained on this ground truth acquired imagery. In this way, when a new image of vegetation is presented to the analyser, where such an image can have an associated time stamp such as time of year and a geographical location such as Germany or South Africa tagged to it, the analyser determines the specific type of weed that is in the image through a comparison of imagery of a weed found in the new image with imagery of different weeds it has been trained on, where the size of weeds, and where and when they grow can also be taken into account. The specific location of that weed type on the ground within the environment, and its size, can therefore be determined.

According to some embodiments, the processing unit 30 has access to a database containing different weed types, and the optimum chemical spray to be used and the mode of operation of a spray gun for that chemical in terms of voltages and field strengths to be used in controlling that weed type, which has been compiled from experimentally determined data. For example, the specific type of chemical to be sprayed on a weed from a number of available chemicals, the duration of spraying to be applied at a specific location for a specific type of weed, and the high voltage to be applied to the atomizer and the field strength to be used, providing information on the height the atomizer should operate at. Thus for example, a specific type of chemical to be used in a chemical spray may be the most optimum for a particular type of weed. The processing unit can then determine that for a single weed or a small clump of this weed at a particular location in the environment the chemical spray gun applying this chemical should be activated at that specific location to control the weeds with that specific chemical. However, that weed could be surrounded by a large clump of a different type of weed, for which a different type of liquid weed control chemical is optimum. Thus, a different chemical can be sprayed over the larger clump, around the first weed. For example, an aggressive chemical can then be sprayed at the specific location of a hard to kill weed, whilst less aggressive chemicals can be sprayed over weeds that are easier to control. Thus, in addition to the atomized spray being electrostatically charged leading to an increase in the chemical being sprayed being deposited on the weed, the type of chemical can be used only when necessary. This leads to a reduction in chemicals used, a reduction in power, and less environmental impact of chemicals. The processing unit ensures that all weeds that need to be controlled, have assigned to them at least chemical to be sprayed in a particular manner via at least one spray gun. The processing unit then creates an appropriate weed control map, detailing what mode or modes of operation of the spray guns should be applied where.

Thus, the cameras 110 of the drones acquire imagery of an environment that is passed to a processing unit 30 that determines what modes of spray gun operation should be used at which specific geographical locations in the environment. Thus, in effect a weed map or a weed spray map can be generated that indicates where within the environment specific modes of operation of spray guns, in terms of chemical, voltage, field strength, height, should be used.

With continued reference to FIG. 6, a weed control train 120 progresses along the railway track. According to some embodiments, the weed control train has a number of trucks, each housing relevant parts of a weed control apparatus 10 and a reservoir 130 of liquid weed control chemical. However, only one truck needs to have the input unit 20 processing unit 30 which could be housed in a front or first truck for example. Each truck can therefore spray a different liquid weed control chemical from a number of spray guns or spray units 40 that are situated below and to the sides of the truck. Each truck also has a separate high voltage power supply 50, and the spray units for each truck can be operated at the same voltage, or through the use of a power supply that can supply more than one voltage at the same time or through the use of more than one power supply in each truck, the spray units for one truck can be operated at different voltages. Each spray unit can be moved vertically up and down to optimize spraying of a detected weed as discussed above. The weed control train has a processor (not shown) which uses the above discussed weed map or weed control map. The weed control train has means to determine its geographical location, which can be based on one or more of GPS, inertial navigation, image analysis in order to locate the position of the weed control train and the specific locations of the different spray units in each truck at particular moments in time. This means that when the weed control train passes through the environment the different spray units can be activated at the specific locations of weeds, where the specific mode of operation of a spray unit in terms of the chemical to be sprayed and at what voltage level and height of the spray unit has been determined to be optimal for that task.

As discussed above, the weed control train can have a camera and acquire imagery. According to some embodiments, acquired imagery can be processed by the processing unit on the weed control train to determine the location of the train itself, through determining the location of sleepers and features in the surroundings. Also, when the weed control train has a GPS and/or an inertial system, the GPS and/or inertial navigation systems can be used to determine the location of the train in order that the spray units can be activated at the location of specific weeds with the correct chemical, and at the determined voltage. However, if the train also has a camera acquiring imagery of the surrounding, feature extraction leading to information such as the position of sleepers etc. can be used to augment the position determined by GPS and/or inertial navigation to make corrections in position in order that the spray unit(s) can activate at the exact locations of weeds, to take into account for example a position derived from the GPS system. Thus, the image processing required to determine the positions of sleepers can run quickly, with location updates being applied rapidly, because the complexity of image processing in locating features such as railway sleepers is not relatively large. A database of what chemical should be used and at what voltage and/or field strength to control specific weeds is used by the processing unit to determine which spray units need to be activated at specific locations in the environment. The train also determines the height of the weed above the ground, through use of imaging or acoustic or radar technology and this information is used to raise/lower the specific spray gun to the optimal height above the weed for spraying.

Figure 7:
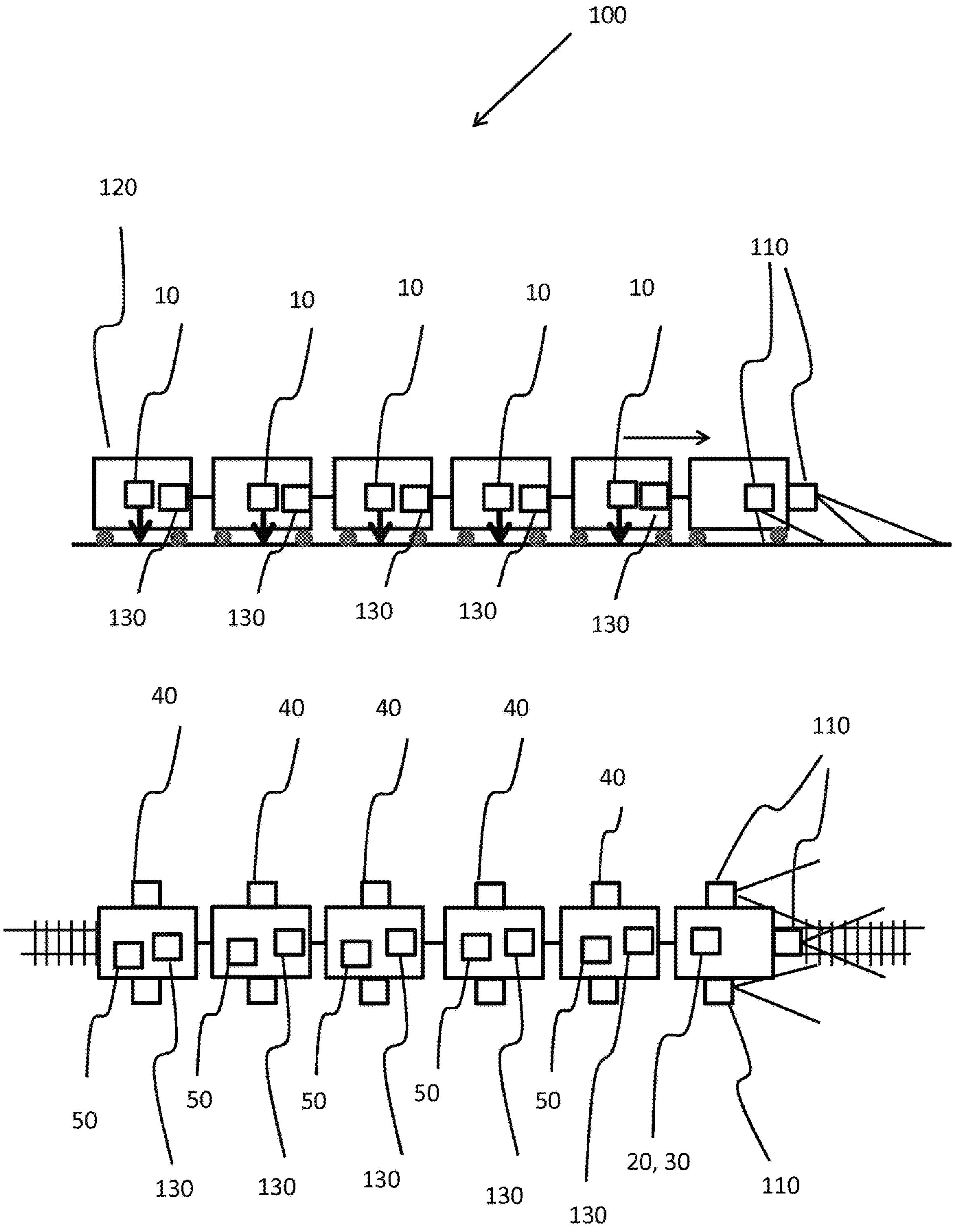
FIG. 7 shows an exemplary schematic of a weed control system according to some embodiments.

FIG. 7 shows another example of a weed control system 100 according to some embodiments. The system of FIG. 7 is similar to that shown in FIG. 6. However, in FIG. 7 the weed control train 120 has cameras 110 and an apparatus 10 as previously discussed. The cameras 110 on the weed control train 120 now acquire that imagery that was previously acquired by the drones. The processing unit 30 of the apparatus on the weed control train 120 processes the acquired imagery to determine the location and type of weed. The exact geographical location of the weed is not then required to be determined. Rather, on the basis of a relative spacing between the cameras 110 and the spray units housed in trucks of the train an acquired image can be located at a specific point on the ground and weeds located and identified within that image and accordingly located on the ground, and the required spray units can then to be activated at the location of the weed that has been determined. Then, from knowledge of the forward motion of the weed control train (its speed) and the time when an image was acquired, it can be determined when the required spray unit should be activated such that it activates at the position of the weed. In this way According to some embodiments, the weed control train does not need to have a GPS and/or inertial navigation system or image based absolute geographical location determination means. Rather, to account for the processing required to determine the type of weed and its exact location within an image and its exact location on the ground—within a train coordinate system—the cameras 110 must may be spaced from the spray units 40 by a distance that is at least equal to the processing time multiplied by the maximum velocity of the weed control train during weed control. Thus for example, if processing takes 0.2 s, 0.4 s, or 0.8 s for a train travelling at 25 m/s, with reference to FIG. 7 the cameras 110 may be spaced forward of the first spray units in the first truck behind the truck carrying the cameras by 5 m, 10 m or 20 m for this train velocity for these different processing times. A reduction in train velocity enables the separation to be reduced. In addition, the cameras 110 that are acquiring the imagery can have very short exposure times in order that image smear due to movement of the train during the exposure time is minimized. This can be by various means, including the use of cameras with short exposure times or short pulsed illumination via for example lasers or LEDs in combination with filters for example. However, the apparatus can use a GPS system and/or inertial navigation system and/or image analysis to determine an exact geographical location of weeds. This means that a log of what weeds have been controlled by what mode of operation of a spray unit in terms of chemical and operational voltage/height and indeed duration of spray at that location, and where those weeds were located can be determined, thereby providing audit information. According to some embodiments, by generating an exact geographical location of the weeds, when each truck of the train has associated location determining means, such as a GPS system and/or inertial navigation system and/or image based system, then this information can be used to ensure that the spray units in a truck activate at the exact position of the specific weed. Thus, a front carriage of a train can have the image acquisition and analysis units that enable a weed control map to be constructed. The last few trucks of a train could then have the spray units housed within them that can operate in the different modes. These latter trucks could be spaced from the front carriage by many tens if not hundreds of metres by load carrying trucks. The absolute separation of the front carriage to the rear carriages could then vary as the train goes up and down hill, but because the trucks with the spray units know their exact locations the required spray unit spraying the required chemical at the required voltage/filed strength can be activated at the precise determined geographical locations of weeds.

FIGS. 6 and 7 shows two views of the weed control train 120, the top being a side view and the bottom showing a plan view. For FIG. 7 the views show the cameras 110 acquiring imagery that extends between the tracks and to the sides of the tracks. The individual trucks of the weed control train have the associated spray units 40 that can be applied beneath the train and to the side of the train.

Figure 8:
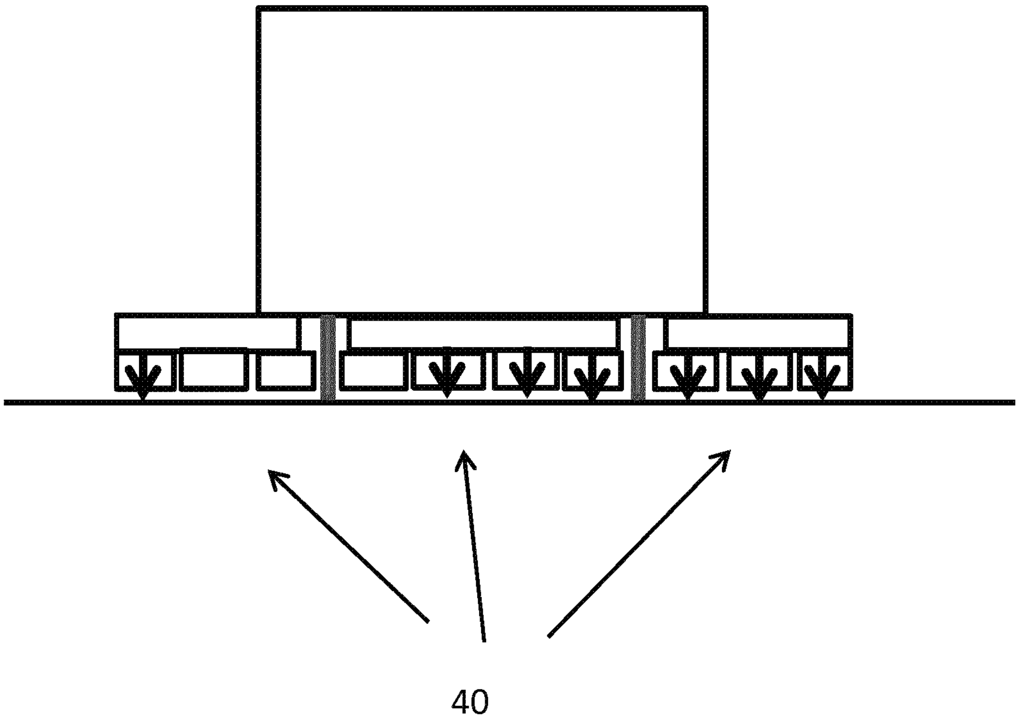
FIG. 8 shows an exemplary schematic of a part of a weed control system according to some embodiments.

FIG. 8 shows a truck of a weed control train 120 as shown in FIGS. 6-7, that has a number of chemical spray units 40 according to some embodiments. FIG. 8 shows a rear view of one truck of the train, with the view being that down the railway track. According to some embodiments, the particular truck is spraying one type of chemical, with individual spray units being able to be operated at different heights and at different voltages. According to some embodiments, a number of separate spray nozzles (spray guns) extend laterally beneath the train and to the sides of the train. According to some embodiments, the spray nozzles can also extend in a forward direction. According to some embodiments, a spray nozzle can itself have specific control, outside of being on or off and at a voltage and at a height, and can be directionally controlled to spray to the left and of right or downwards, and/or to be controlled such that the angular extent of the spray is varied in order that for example a narrow jet of spray can be directed to a single weed. According to some embodiments, the different angular spray arrangements can require operation at a different voltages and heights in order to optimize transfer of the chemical to the weed being sprayed. When one of these spray nozzles passes over a weed that has been identified as one that should be controlled by that particular chemical spray the processor 30 activates the specific nozzle that sprays chemical at the specific location of the weed that is required to be controlled by a that chemical spray. In FIG. 8 there are two specific locations of such a weed, one to be found between the track that extends to the right and one to the left of the tracks, and accordingly a number of spray nozzles have been activated under the train and to the right with one spray nozzle being activated to the left. It is to be noted that weeds can pass under this truck that have already had one of the other chemicals applied by a forward truck, and an unsprayed weed can pass under this truck if it has been determined that it should be sprayed by one or more spray units in a following truck to spray a different chemical for example.

Figure 9:
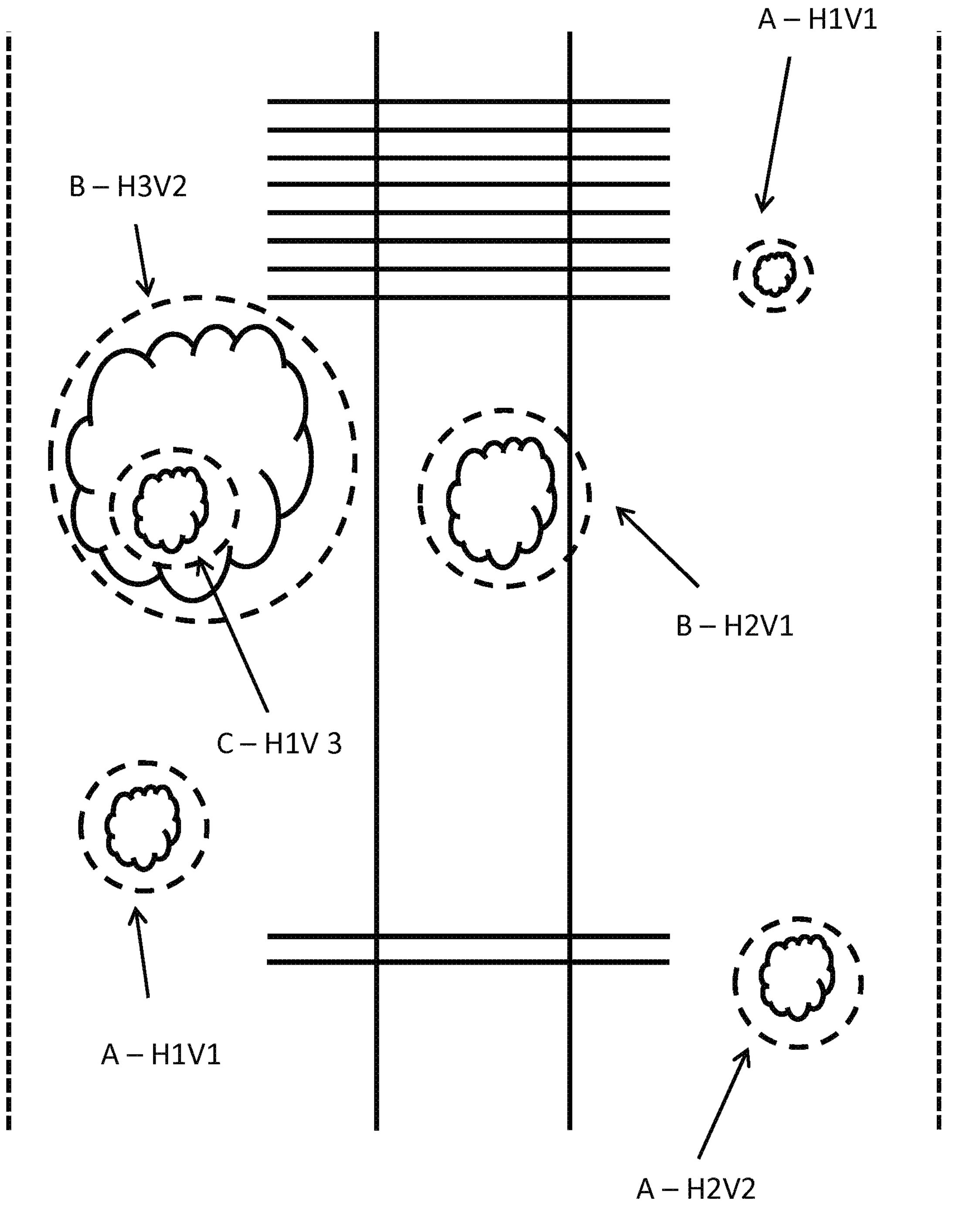
FIG. 9 shows a schematic representation of a railway track and surrounding area according to some embodiments.

FIG. 9 shows a representation of a railway environment, showing the railway tracks and the ground to the side of the tracks according to some embodiments. A number of weed areas are shown, with a large clump of one type of weed having a clump of a different type of weed within it. According to some embodiments, shown in FIG. 9 are the specific modes of operation of spray units that have been determined to be activated for these specific weeds. According to some embodiments, three different chemicals "A", "B" and "C" can be sprayed, and the spray units can operate at three different heights "H1", "H2" and "H3", and operate at three voltage levels "V1", "V2" and "V3". Thus, a particular type of weed has been identified that is of a size that requires it to be sprayed with chemical A, at a voltage level V1 and at a height H1, with this existing in two locations. A particular type of weed has been identified that is of a size that requires it to be sprayed with chemical A, at a voltage level V2 and at a height H2, with this existing in one location. This could be the same type of weed as that discussed previously that was also sprayed with chemical A, but is of a size that requires slightly different height and voltage settings to optimize the transfer of atomized liquid weed control chemical to the weed, or can be a different weed type with the different settings being optimal for control via spraying of that weed. Similarly, another weed has been identified that needs to be sprayed with chemical B, at a voltage V1 and at a height H2. There is a large clump of weed (that could be the same type as the previous weed or a different weed) that needs to be sprayed with chemical B, at a voltage V2 and at a height H3. But found within that clump of weed is an isolated different type of weed that needs to be sprayed with a particularly strong chemical C, at a height H1 and at a voltage V3. In this way, weeds are controlled in an optimized manner with increased transfer of chemical to the weed enabling less chemical to be used, and with a further reduction in the use of the most aggressive chemicals, which are applied only where absolutely necessary. This determination of what mode of operation of the different spray units in terms of chemical, voltage and height of operation can be considered to be the weed control map discussed above with respect to FIG. 6, or the real-time determination of what mode of operation of a spray unit should be applied as discussed with respect to FIG. 7.

Figure 10:
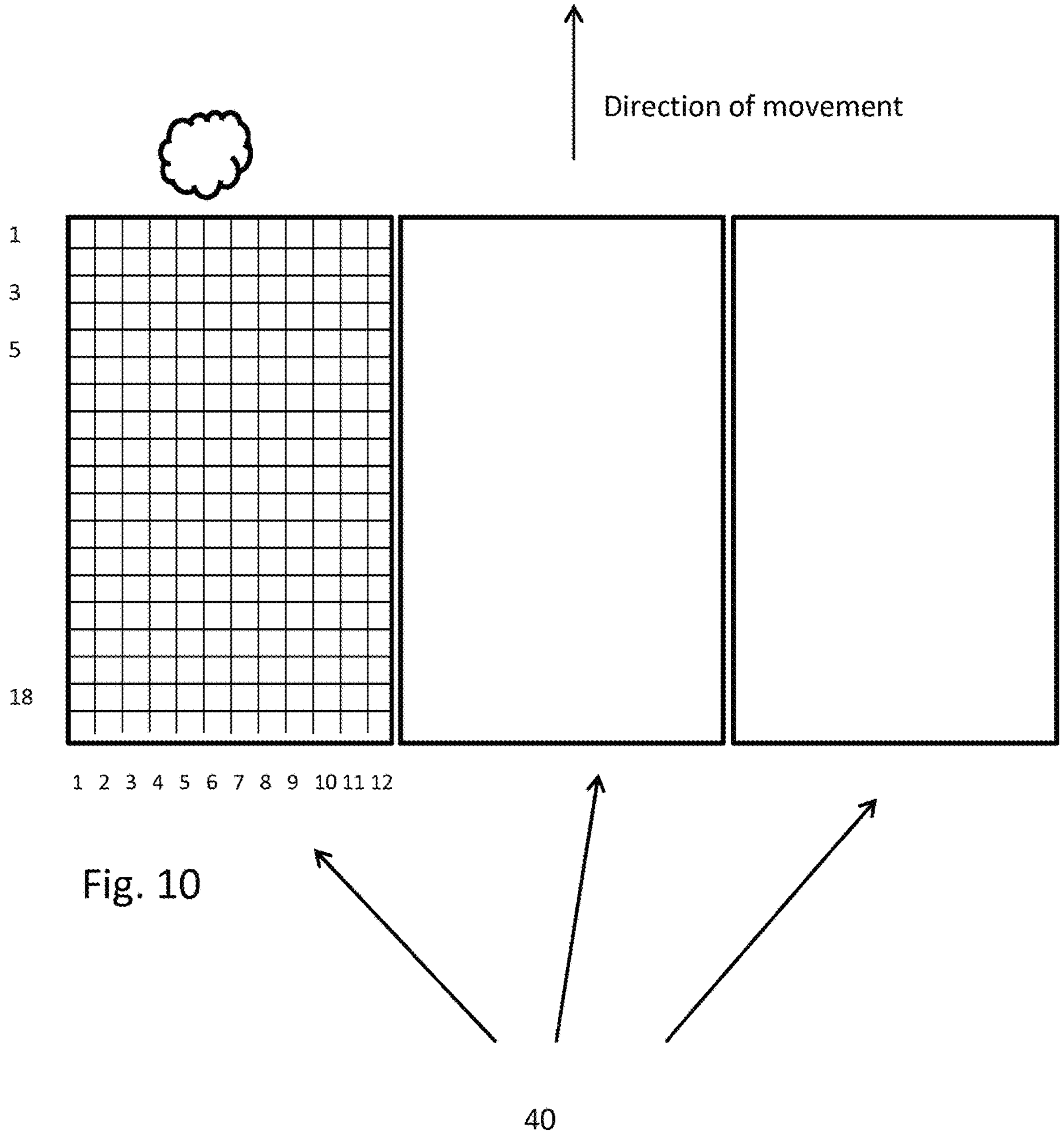
FIG. 10 shows an exemplary schematic of a part of a weed control system according to some embodiments.

FIG. 10 shows a plan view of one of the train trucks according to some embodiments, relating to the spray units 40. A number of individual spray guns or nozzles of the spray units are mounted beneath and to the side of the truck of the train, as shown in FIGS. 6 and 7. There According to some embodiments, there are three sets of spray guns, one underneath the truck and one to the left and one to the right. Only the one to the right is shown in detail. Regarding the set to the right, in this specific example there are 19 rows of spray guns and 12 columns of spray guns. There can be various numbers of columns of spray guns and various row numbers, and there may only be one row—as discussed above a spray gun can also be considered to be a spray unit, or a part of a spray unit because a spray unit can also include a reservoir of a chemical. Here, chemical A is being sprayed with all the spray guns operating at a voltage V1. The weed control train in this example, has 9 trucks, three with chemical A, three with chemical B, and three with chemical C, and where different trucks operate at voltages V1, V2 and V3. However, according to some embodiments and as discussed above it is possible for spray guns to have different voltages applied to them. Referring to a coordinate system of row×column, then as the train moves forward spray guns 1×4, 1×5, 1×6 and 1×7 activate as these spray guns pass over the location of the weed. With further movement, in an example only these spray guns are active until these spray guns have passed over the weed. In this way a minimum duration of chemical A can be applied. However, according to some embodiments, the spray guns can activate as the weed is located at different positions beneath the sub-unit and in this way a duration of spraying can be varied. Thus, when the weed is first located under the front edge of the sub-unit spray guns 1×4-7, 2×4-7 and 3×4-7 are activated. As the train moves forward, 2×4-7, 3×4-7 and 4×4-7 are activated, then 3×4-7, 4×4-7 and 5×4-7 are activated. In this way, the weed progresses under the sub unit and at all positions the appropriate spray guns are activated until 17×4-7, 18×4-7 and 19×4-7 are activated, then 18×4-7 and 19×4-7 and finally 19×4-7 are activated. In this way a wave of spray guns activate at a fixed position on the ground (th location of the weed), with the wave moving at the speed of the train—in a rearward direction relative to the front of the train that is moving in a forward direction. According to some embodiments, different durations of application of chemical A can be applied through activation of different number of spray guns. Thus, even for a fixed speed of the train different chemicals can be sprayed on weeds for different durations, again enabling difficult to kill weeds to have a long spray duration and thus more chemical sprayed on that weed, whilst easy to control weeds can have a minimum duration of spray applied. This means that the amount of chemical used can again be minimized, and the spray guns can operate at fixed flow rates, enabling simple spray guns to be used.

Figure 11:
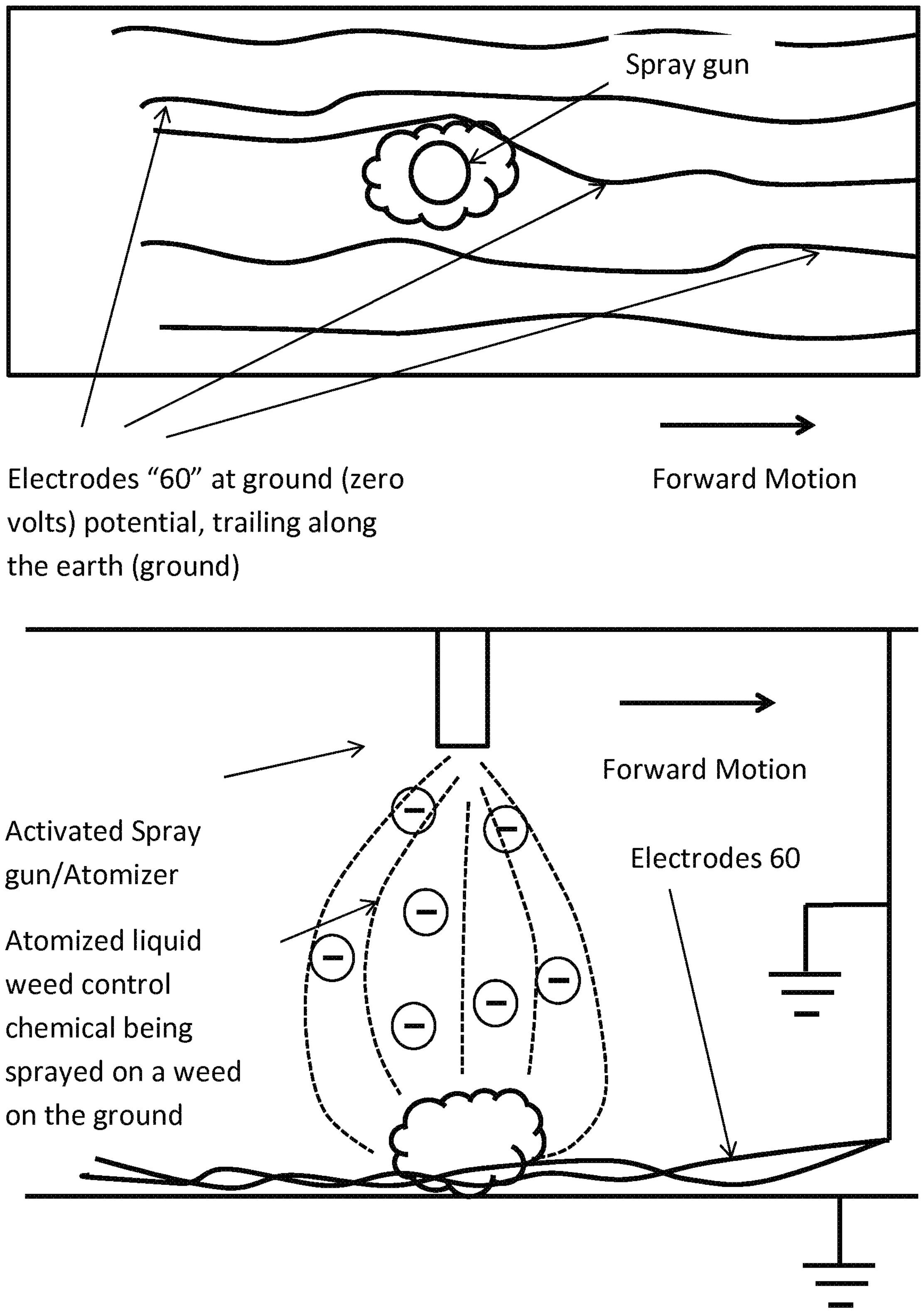
FIG. 11 shows an exemplary schematic of a part of a weed control system according to some embodiments.

FIG. 11 shows an example of part of a weed control system according to some embodiments. For simplicity only one spray gun (nozzle/atomizer) of a spray unit is shown. The top image shows a plan view and the bottom image shows a side view. According to some embodiments, the spray gun is attached to the bottom of the truck of a train which is moving in a left to right motion. Normally the weeds being sprayed do not become electrostatically charged because the duration of spraying is not too long, as the spraying is moving to new areas, and the vegetation itself contains a proportion of water and is conductive to a certain degree. However, certain weeds can be sprayed for a prolonged period via a number of different spray guns activating when passing over that weed, and certain weeds can be less conductive that others. According to some embodiments, to mitigate the charging up of the weeds, leading to a reduction in the transfer efficiency, a number of grounded electrodes 60 (held at ground potential or zero volts) are attached to the front of the truck spaced along the front edge of the truck and trail along the ground. These touch vegetation and help ensure that that vegetation does not become excessively charged. Also, a definite ground plane is formed that helps attract the charged atomized liquid weed control downwards, helping to mitigate the effects of drift of the chemical.

Figure 12:
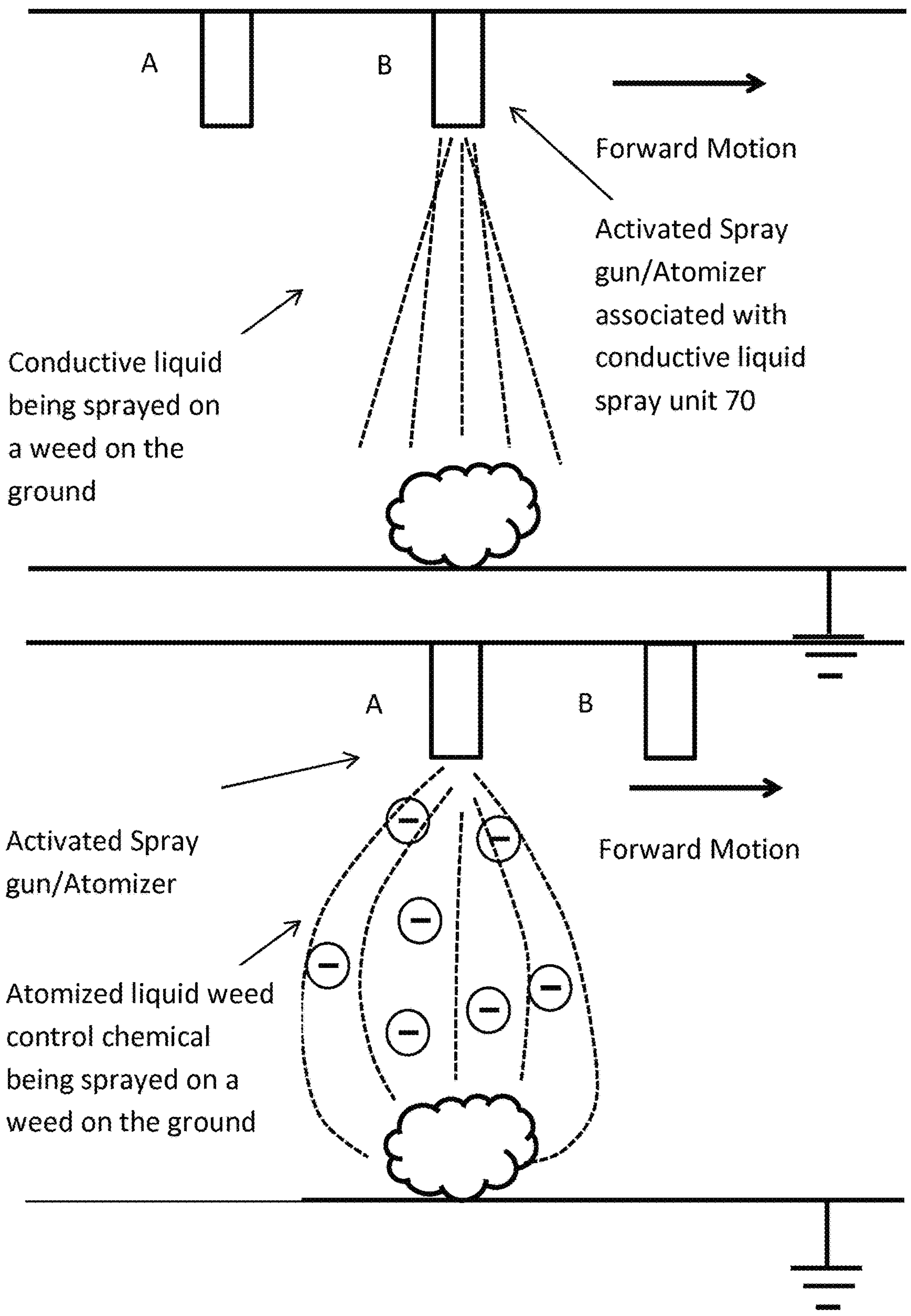
FIG. 12 shows an exemplary schematic of a part of a weed control system according to some embodiments.

According to some embodiments, FIG. 12 shows another example, by which the effects of weed charging up can be mitigated. There are two nozzles shown, nozzle A that sprays a liquid weed control chemical, and nozzle B—also referred to as spray unit 70—that sprays a conductive liquid such as brine (sea water). As discussed above, the location of a weed is determined. Nozzle B passes over the weed first as the train moves forward. The brine is sprayed over the weed. The liquid being sprayed does not have a detrimental environmental effect, and need not be charged. Then, the nozzle that sprays the liquid weed control chemical moves over the weed, and the liquid weed control chemical is atomized and charged and sprayed over the weed as discussed above. The surface of the weed now has greater conductivity to ground due to it having been previously sprayed with sea water, and the weed does not become electrostatically charged. Rather than spray sea water (brine), other conductive chemicals as known by the skilled person can be sprayed.

The above detailed examples have been discussed with respect to a railway and a weed control train. However, according to some embodiments, rather than a weed control train, a truck or lorry or Unimog can have the spray units and chemical reservoir(s) as discussed above, and on the basis of previously acquired and processed imagery or on the basis of imagery it acquires and processes itself, drives around an industrial area or even an area such as an airport and activates the spray units as discussed above to control weeds at specific locations.

In some exemplary embodiments, a computer program or computer program element is provided that is characterized by being configured to execute the method steps of the method according to one of the preceding embodiments, on an appropriate system.

According to some embodiments, the computer program element might be stored on a computer unit. This computing unit may be configured to perform or induce performing of the steps of the method described above. Moreover, it may be configured to operate the components of the above described apparatus and/or system. According to some embodiments, the computing unit can be configured to operate automatically and/or to execute the orders of a user. A computer program may be loaded into a working memory of a data processor. The data processor may thus be equipped to carry out the method according to one of the preceding embodiments.

These exemplary embodiments cover both, a computer program that right from the beginning uses the invention and computer program that by means of an update turns an existing program into a program that uses invention.

According to some embodiments, the computer program element might be able to provide all necessary steps to fulfill the procedures of the exemplary embodiments of the method as described above.

According to some embodiments, a computer readable medium, such as a CD-ROM, USB stick or the like, is presented wherein the computer readable medium has a computer program element stored on it which computer program element is described by the preceding section.

According to some embodiments, a computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to some embodiments, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word “comprising” does not exclude other elements or steps, and the indefinite article “a” or “an” does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A weed control apparatus for a vehicle, comprising:

at least one chemical spray unit configured to atomize a liquid weed control chemical and comprising at least one part configured to be held at high voltage with respect to zero volts potential;

at least one high voltage power supply; and a processor configured to:

receive from an input at least one image of an environment, and analyze the at least one image to activate the at least one chemical spray unit, wherein the at least one high voltage power supply and the at least one chemical spray unit are configured to hold the at least one part of the at least one chemical spray unit at at least one high voltage with respect to zero volts potential, such that the atomized liquid weed control chemical is electrically charged.

2. The apparatus of claim 1, wherein the at least one chemical spray unit is configured such that the atomized liquid weed control chemical is charged after it has been atomized.

3. The apparatus of claim 1, wherein the at least one part comprises an electrode configured to be positioned within the atomized liquid weed control chemical.

4. The apparatus of claim 1, wherein the processor is configured to analyze the at least one image to determine at least one location for activation of the at least one chemical spray unit.

5. The apparatus of claim 4, wherein analysis of the at least one image to determine the at least one location for activation of the at least one chemical spray unit comprises a determination of at least one location of vegetation in the environment.

6. The apparatus of claim 4, wherein analysis of the at least one image to determine the at least one location for activation of the at least one chemical spray unit comprises a determination of at least one type of weed.

7. The apparatus of claim 1, wherein the at least one image was acquired by at least one camera, and wherein the processor is configured to receive from the input at least one location associated with the at least one camera when the at least one image was acquired.

8. The apparatus of claim 1 comprising at least one electrode configured to be held at or close to zero volts potential, and wherein the apparatus is configured such that the at least one electrode can be positioned on a ground plane spaced away from the at least one chemical spray unit such that activation of the at least one chemical spray unit will result in liquid weed control chemical being sprayed at a location corresponding to the position on the ground plane of the at least one electrode.

9. The apparatus of claim 1, further comprising at least one conductive liquid spray unit configured to spray a conductive spray prior to spraying of the liquid weed control chemical.

10. A weed control system, comprising:

at least one camera configured to acquire at least one image;

at least one reservoir mounted on a vehicle, the at least one reservoir configured to hold at least one liquid weed control chemical; and a weed control apparatus mounted on the vehicle, the weed control apparatus comprising:

at least one chemical spray unit configured to be in fluid connection with the at least one reservoir, at least one high voltage power supply, and a processor configured to:

receive from the at least one camera the at least one image, and analyze the at least one image to activate the at least one chemical spray unit, wherein, the at least one high voltage power supply and the at least one chemical spray unit are configured to hold the at least one part of the at least one chemical spray unit at at least one high voltage with respect to zero volts potential, such that the atomized liquid weed control chemical is electrically charged, wherein the weed control apparatus is configured to atomize, charge and spray the at least one liquid weed control chemical.

11. The system of claim 10, wherein the at least one camera is mounted on the vehicle.

12. A weed control method for a vehicle, comprising:

receiving by a processor at least one image of an environment;

analysing by the processor the at least one image to activate at least one chemical spray unit;

atomizing and charging a liquid weed control chemical by the at least one chemical spray unit;

wherein the at least one chemical spray unit has at least one part configured to be held at high voltage with respect to zero volts potential; and wherein at least one high voltage power supply and the at least one chemical spray unit are configured to hold the at least one part of the at least one chemical spray unit at at least one high voltage with respect to zero volts potential, such that the atomized liquid weed control chemical is electrically charged.

13. The method of claim 12, wherein atomizing and charging the liquid weed control chemical comprises atomizing the liquid weed control chemical prior to charging.

14. The method of claim 12, wherein the at least one image was acquired by at least one camera; and wherein the method comprises receiving by the processor at least one location associated with the at least one camera when the at least one image was acquired.

15. The method of claim 12, comprising holding at least one electrode at or close to zero volts potential, positioning the at least one electrode on a ground plane spaced away from the at least one chemical spray unit, and spraying by the at least one chemical spray unit the liquid weed control chemical at a location corresponding to the position on the ground plane of the at least one electrode.

16. A non-transitory computer readable medium comprising instructions that, when executed by one or more processors of a system, cause the system to:

receive by the one or more processors the at least one image of an environment;

analyze by the one or more processors the at least one image to activate at least one chemical spray unit; and atomize and charge a liquid weed control chemical by the at least one chemical spray unit;

wherein the at least one chemical spray unit has at least one part configured to be held at high voltage with respect to zero volts potential; and wherein at least one high voltage power supply and the at least one chemical spray unit are configured to hold the at least one part of the at least one chemical spray unit at at least one high voltage with respect to zero volts potential, such that the atomized liquid weed control chemical is electrically charged.

* * * * *